United States Patent
Panecki et al.

(10) Patent No.: US 11,785,372 B2
(45) Date of Patent: Oct. 10, 2023

(54) WIRELESS LISTENING DEVICE

(71) Applicant: APPLE INC., Cupertino, CA (US)

(72) Inventors: Lee M. Panecki, Cupertino, CA (US); Michael B. Minerbi, San Francisco, CA (US); Sean T. McIntosh, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/496,746

(22) Filed: Oct. 7, 2021

(65) Prior Publication Data

US 2022/0217463 A1 Jul. 7, 2022

Related U.S. Application Data

(60) Provisional application No. 63/165,991, filed on Mar. 25, 2021, provisional application No. 63/134,922, filed on Jan. 7, 2021.

(51) Int. Cl.
*H04R 1/10* (2006.01)
*H04R 1/02* (2006.01)
*G06F 3/16* (2006.01)
*H02J 50/10* (2016.01)
*H04W 4/80* (2018.01)

(52) U.S. Cl.
CPC .......... *H04R 1/1025* (2013.01); *G06F 3/165* (2013.01); *G06F 3/167* (2013.01); *H02J 50/10* (2016.02); *H04R 1/023* (2013.01); *H04R 1/1016* (2013.01); *H04R 1/1041* (2013.01);
(Continued)

(58) Field of Classification Search
CPC .. H04R 1/1016; H04R 1/1023; H04R 1/1041; H04R 2201/10; H04R 2225/51; H04R 2225/77
See application file for complete search history.

(56) References Cited

U.S. PATENT DOCUMENTS 6,127,038 A 10/2000 McCullough et al.
8,976,994 B2 * 3/2015 Howes ................. H04R 1/2807
381/370

(Continued)

FOREIGN PATENT DOCUMENTS

CN 205622800 10/2016
CN 207150834 3/2018
KR 102037826 10/2019

OTHER PUBLICATIONS

Non-Final Office Action issued in U.S. Appl. No. 17/496,748, dated Sep. 13, 2022 in 15 pages.
(Continued)

*Primary Examiner* — Ryan Robinson
(74) *Attorney, Agent, or Firm* — KILPATRICK TOWNSEND & STOCKTON LLP

(57) ABSTRACT

An earphone comprising: a device housing that defines an internal cavity within the device housing; an acoustic port formed through a wall of the device housing and having an opening at an exterior surface of the device housing; an audio driver disposed within the device housing and aligned to emit sound through the acoustic port; and a mesh disposed within the acoustic port and having an outer periphery spaced apart from the device housing wall, wherein the mesh forms a portion of an exterior surface of the earphone that is recessed from the opening at the exterior surface of the device housing.

20 Claims, 20 Drawing Sheets

(52) U.S. Cl.
CPC ...... *H04R 2420/07* (2013.01); *H04R 2460/11* (2013.01); *H04W 4/80* (2018.02)

(56) References Cited

U.S. PATENT DOCUMENTS

| | | | |
|---|---|---|---|
| 9,258,663 B2* | 2/2016 | Aase | H04R 1/1058 |
| 9,414,154 B2* | 8/2016 | Tung | H04R 1/1016 |
| 9,510,076 B2* | 11/2016 | Lee | A61F 11/08 |
| 9,712,905 B2* | 7/2017 | Zorkendorfer | H04R 1/10 |
| 9,866,945 B2 | 1/2018 | McAuliffe et al. | |
| 9,967,646 B2 | 5/2018 | Hankey et al. | |
| 10,097,913 B2 | 10/2018 | Zörkendörfer et al. | |
| 10,820,088 B2* | 10/2020 | Zalisk | H04R 1/086 |
| 10,986,433 B2 | 4/2021 | McIntosh et al. | |
| 11,223,895 B2* | 1/2022 | Nilsen | H04R 1/1075 |
| 11,234,067 B1* | 1/2022 | Liang | H04R 1/1058 |
| 11,381,898 B2* | 7/2022 | Choi | H04R 9/06 |
| 2012/0135292 A1 | 5/2012 | Buckingham et al. | |
| 2012/0201406 A1* | 8/2012 | Yamaguchi | H04R 1/1016 |
| | | | 381/309 |
| 2017/0064427 A1 | 3/2017 | Rich et al. | |
| 2017/0164086 A1 | 6/2017 | Harper | |
| 2017/0311105 A1 | 10/2017 | Hariharan et al. | |
| 2018/0103312 A1* | 4/2018 | McAuliffe | H01Q 1/273 |
| 2020/0075272 A1* | 3/2020 | Solis | H04R 1/1016 |
| 2020/0084533 A1 | 3/2020 | Hankey et al. | |
| 2020/0092628 A1* | 3/2020 | Osugi | H04R 1/023 |
| 2020/0100010 A1 | 3/2020 | Yang et al. | |
| 2020/0107100 A1 | 4/2020 | Stanley et al. | |
| 2020/0107110 A1* | 4/2020 | Ji | H04R 1/1091 |
| 2020/0275182 A1* | 8/2020 | Ettensberger | H04R 1/1041 |
| 2021/0400408 A1 | 12/2021 | Khenkin | |

OTHER PUBLICATIONS

Extended European Search Report issued in European Application No. EP21213102.3, dated Aug. 30, 2022 in 14 pages.
Partial Supplemental European Search Report issued in European Application No. EP21213102.3, dated May 30, 2022 in 14 pages.
First Examination Report issued in India Application No. IN202114055459, dated Jul. 15, 2022 in 6 pages.
Corrected Notice of Allowability issued in U.S. Appl. No. 17/496,748, dated Jan. 5, 2023 in 5 pages.
Notice of Allowance issued in U.S. Appl. No. 17/496,748, dated Dec. 21, 2022 in 8 pages.

* cited by examiner

WIRELESS LISTENING DEVICE

This application is claims the benefit of U.S. Provisional Patent Application No. 63/134,922, filed Jan. 7, 2021, entitled "WIRELESS LISTENING DEVICE," and claims the benefit of U.S. Provisional Patent Application No. 63/165,991, filed Mar. 25, 2021, entitled "WIRELESS LISTENING DEVICE." Each of the '922 and '991 applications are hereby incorporated by reference herein in their entirety for all purposes.

This application is related to concurrently filed U.S. Non-provisional patent application Ser. No. 17/496,748, "WIRELESS LISTENING DEVICE", which is incorporated herein by reference in its entirety for all purposes.

BACKGROUND

Portable listening devices, such as headphones, can be used with a wide variety of electronic devices such as portable media players, smart phones, tablet computers, laptop computers, stereo systems, and other types of devices. Portable listening devices have historically included one or more small speakers configured to be place on, in, or near a user's ear, structural components that hold the speakers in place, and a cable that electrically connects the portable listening device to an audio source. Relatively recently, wireless portable listening devices that do not include a cable and instead, wirelessly receive a stream of audio data from a wireless audio source, have become ubiquitous. Such wireless portable listening devices can include, for instance, wireless earbud devices or wireless in-ear hearing devices that operate in pairs (one for each ear) or individually for outputting sound to, and receiving sound from, the user.

While wireless portable listening devices have many advantages over wired portable listening devices and have become a very popular with consumers, improved wireless portable listening devices are desirable.

BRIEF SUMMARY

The present disclosure describes various embodiments of portable listening devices that can enable a user to experience high-end acoustic performance and a pleasant, positive user experience.

In some embodiments an earphone comprises: a device housing that defines an internal cavity within the device housing; an acoustic port formed through a wall of the device housing and having an opening at an exterior surface of the device housing; an audio driver disposed within the device housing and aligned to emit sound through the acoustic port; and a mesh disposed within the acoustic port and having an outer periphery spaced apart from the device housing wall, wherein the mesh forms a portion of an exterior surface of the earphone that is recessed from the opening at the exterior surface of the device housing.

In some embodiments, a portable acoustic device is provided that comprises: a device housing that defines an internal cavity within the device housing, the device housing comprising a speaker housing portion and a stem portion extending away from the speaker housing portion, wherein the speaker housing portion and stem portion combine to define the internal cavity within the device housing; an acoustic port formed through a wall of the device housing and having an opening at an exterior surface of the device housing, wherein the wall includes first and second edges separated by a shelf that extends fully around a perimeter of the acoustic port; an audio driver disposed within the device housing and aligned to emit sound through the acoustic port; and a mesh disposed within the acoustic port and having an outer periphery spaced apart from the device housing wall, wherein the mesh forms a portion of an exterior surface of the portable acoustic device that is recessed from the opening at the exterior surface of the speaker housing.

In still further embodiments a portable acoustic device is provided that comprises: a device housing that defines an internal cavity within the device housing, the device housing comprising a speaker housing portion and a stem portion extending away from the speaker housing portion, wherein the speaker housing portion and stem portion combine to define the internal cavity within the device housing; a wireless antenna disposed within the housing; an acoustic port formed through a wall of the device housing and having an opening at an exterior surface of the device housing, wherein the wall includes first and second edges separated by a shelf that extends fully around a perimeter of the acoustic port; an audio driver disposed within the device housing and aligned to emit sound through the acoustic port; a battery disposed within the housing; and a mesh disposed within the acoustic port and having an outer periphery spaced apart from the device housing wall, wherein the mesh forms a portion of an exterior surface of the portable wireless acoustic device that is recessed from the opening at the exterior surface of the device housing.

In some embodiments, a portable wireless acoustic device comprises: a device housing that defines an internal cavity, the device housing comprising a speaker housing portion and a stem portion extending away from the speaker housing portion; a first acoustic port formed through a wall of the speaker housing; an audio driver disposed within the speaker housing portion and aligned to emit sound through the acoustic first port; a battery disposed within the speaker housing portion and positioned an opposite side of the audio driver than the acoustic port; an antenna disposed in the stem; a user input region disposed along the stem; and a system in a chip disposed in the stem, the system in a chip comprising: a processor that controls operation of the portable wireless acoustic device, charging circuitry, an accelerometer, a wireless communication controller, support components for the antenna and support components for the user input region.

In some further embodiments a portable wireless acoustic device includes: a device housing defining an internal cavity; an acoustic port formed through the device housing; an audio driver disposed within the device housing and aligned to emit sound through the acoustic port; one or more electronic components that require power to operate; a battery disposed within the device housing and operable to provide power to the one or more electronic components, the battery having an exterior surface and including first and second electrical interconnects extending away from the exterior surface and configured to enable the battery to be operatively coupled to the one or more electronic components; and a hydrophobic coating deposited over an entire exterior surface of the battery except for the first and second electrical interconnects.

In still further embodiments, an earphone comprises: a device housing including a speaker housing that defines an internal cavity within the device housing; an acoustic port formed through the device housing; an audio driver disposed within the device housing and aligned to emit sound through the acoustic port, wherein the audio driver cooperates with an inner surface of the speaker housing to define a front volume within the device housing for the audio driver that is sealed to an ambient environment except for a free flowing air path to the ambient environment through the acoustic port; a microphone disposed within the front volume of the device housing; and a processor operatively coupled to receive output from the microphone, the processor configured to change an audio profile of the audio driver based on output from the microphone.

Various implementations of an earphone or portable acoustic device described herein can include one or more of the following features. The mesh can be recessed within the acoustic port between 0.5 to 2.0 mm from an opening at the exterior surface of the device housing. The mesh can have a convex profile in which outer edges of the mesh are recessed further from the opening at the exterior surface of the housing than a center of the mesh. The wall can include first and second edges separated by a shelf that extends fully around a perimeter of the acoustic port. The shelf can define an acoustic dead zone that surrounds an outer periphery of acoustic port and the outer periphery of the mesh is disposed within the acoustic dead zone. The mesh can be a multi-layer mesh that includes an outer cosmetic mesh and an inner acoustic mesh. The device housing can include a speaker housing and a stem extending away from the speaker housing. The speaker housing and the stem can combine to define the internal cavity within the device housing. The earphone or portable acoustic device can include a user input region along a portion of the stem. The earphone or portable acoustic device can include a force sensor disposed within the stem adjacent to the user input region. The earphone or portable acoustic device can include an antenna disposed within the stem. The earphone or portable acoustic device can further include a bass port formed through the housing and configured to provide an acoustic pathway from the driver that allows air to flow easier within the acoustic pathway for low frequency sounds, and a control leak formed through the housing and configured to provide an atmospheric pass-through between an outside environment and the acoustic port such that, when the earphone or portable acoustic device is worn by a user, the housing does not completely seal a user's ear canal and trap pressure within the ear canal.

Various implementations of an earphone or acoustic device described herein can include one or more of the following features. The device can include a second port formed through a surface of the device housing that faces a user's ear when the portable wireless acoustic device is worn by the user. The device can include an optical sensor operatively coupled to the second port. The optical sensor can include an emitter that emits radiation of a first wavelength and of a second wavelength, different than the first wavelength, through the second port and a detector operable to detect radiation of the first and second wavelength after the radiation is reflected off the user's ear where the first and second wavelengths have different frequency dependences on human skin. The processor can be operatively coupled to receive output from the detector, and can be configured to calculate a ratio of detected radiation of the first wavelength to detected radiation of the second wavelength and generate an in-ear detect signal based on the calculated ratio being within a predetermined range. The device can further include an accelerometer and the processor can generate the in-ear detect signal based on a combination of a signal output by the accelerometer and the calculated ratio of detected radiation of the first wavelength to detected radiation of the second wavelength. The speaker housing portion can include a front volume acoustically separated from a back volume where the front volume is disposed between the audio driver and the first acoustic port and the back volume being disposed behind the audio driver. The battery can be disposed within the back volume and can have an exterior surface along with first and second electrical interconnects extending away from the exterior surface that enable the battery to be operatively coupled to the one or more electronic components within the device housing. The battery can have a hydrophobic coating deposited over an entire exterior surface of the battery except for the first and second electrical interconnects. The hydrophobic coating can be a type N parylene. The hydrophobic coating can be between 15-30 microns thick. The battery can further include a second hydrophobic coating sprayed over the first coating in a portion of the battery facing the back volume. The second hydrophobic coating can be a fluorochemical acrylic polymer. The audio driver can cooperate with an inner surface of the speaker housing to define a front volume within the speaker housing portion for the audio driver that is sealed to an ambient environment except for a free flowing air path to the ambient environment through the first acoustic port. The earphone or acoustic device can further include a microphone disposed within the front volume of the device housing. The processor can be operatively coupled to receive output from the microphone and can be configured to change an audio profile of the audio driver based on output from the microphone. The speaker housing can be sized and shaped to fit within a user's ear without any portion of the earphone being inserted into the user's ear canal. The microphone can be tuned to listen to low frequencies in the front volume that are indicative of a quality of fit of the earphone in a user's ear, and the processor can be configured to adjust the audio settings of the audio driver based on the output from the microphone. The processor can be configured to boost low frequency sound generated by the audio driver if the processor determines that the speaker housing forms a poor seal in a user's ear.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIGS. 3A-3C are simplified views of a portable wireless earbud according to some embodiments;

DETAILED DESCRIPTION

Figure 1:
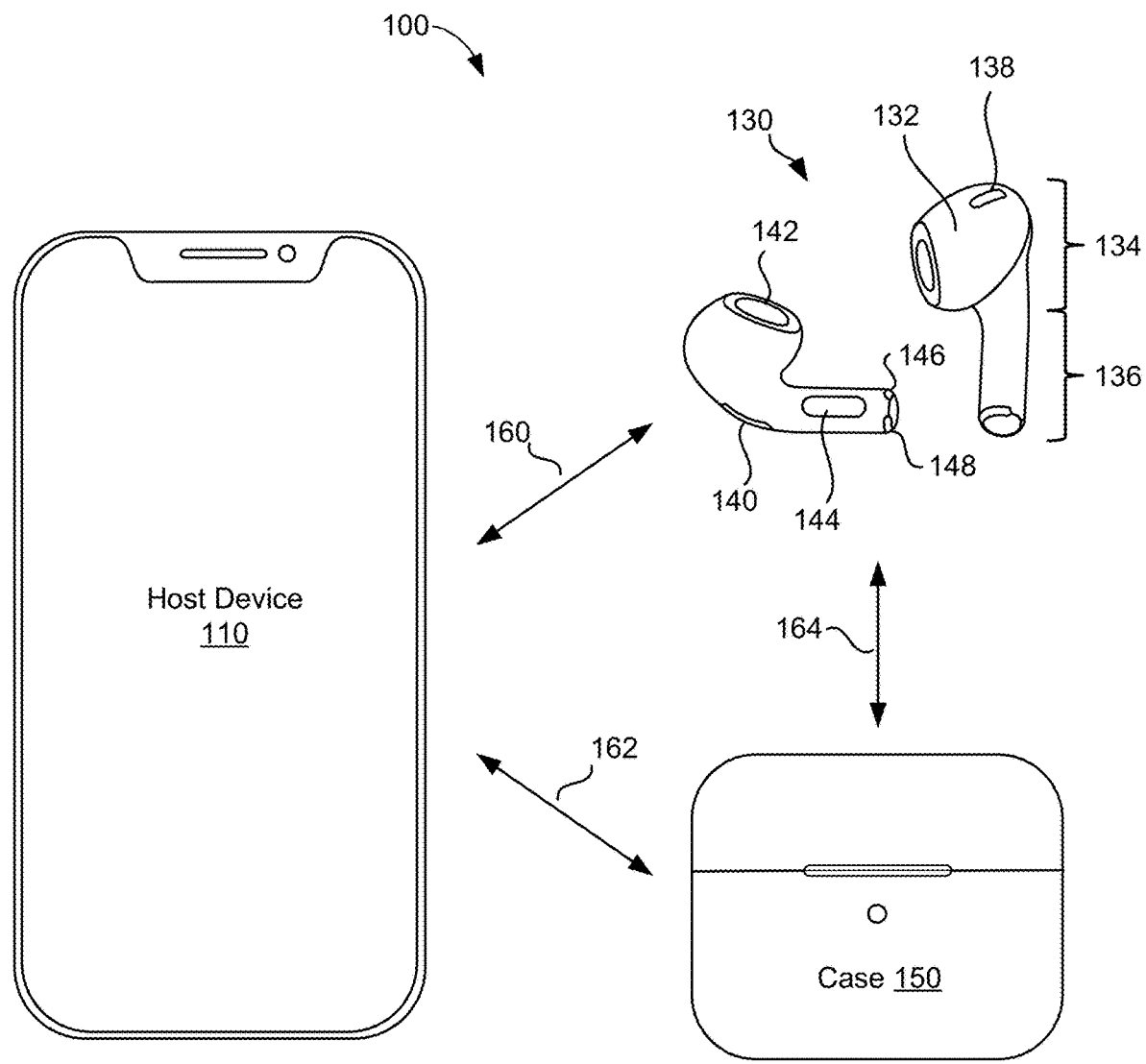
FIG. 1 is a simplified illustration of an exemplary portable electronic listening device system having a host device configured as a smart phone, a case, and a pair of wireless listening devices configured as earbuds, according to some embodiments.

Some embodiments of the disclosure pertain to a portable wireless listening that can deliver high-end acoustic performance to a user along with a pleasant and intuitive user experience. Other embodiments pertain to a case for charging and storing one or more portable wireless listening devices. Still other embodiments pertain to a system that includes both a pair of portable wireless listening devices and a charging case for the devices.

As used herein, the term "portable listening device" includes any portable device configured to be worn by a user and placed such that a speaker of the portable listening device is adjacent to or in a user's ear. A "portable wireless listening device" is a portable listening device that is able to receive and/or send streams of audio data from or to a second device without a wire connecting the portable wireless listening device to the second device using, for example, a wireless communication protocol.

Headphones are one type of portable listening device, headsets (a combination of a headphone and an attached microphone) are another and hearing aids (in-ear devices that are designed to augment sounds from the surrounding environment to improve a user's hearing) are still an additional type of portable listening device. The term "headphones" represents a pair of small, portable listening devices that are designed to be worn on or around a user's head. They convert an electrical signal to a corresponding sound that can be heard by the user. Headphones include traditional headphones that are worn over a user's head and include left and right earcups connected to each other by a headband, and earphones (very small headphones that are designed to be fitted directly in a user's ear). Traditional headphones include both over-ear headphones (sometimes referred to as either circumaural or full-size headphones) that have earpads that fully encompass a user's ears, and on-ear headphones (sometimes referred to as supra-aural headphones) that have earpads that press against a user's ear instead of surrounding the ear.

The term "earphones", which can also be referred to as ear-fitting headphones, includes both small headphones, sometimes referred to as "earbuds", that fit within a user's outer ear facing the ear canal without being inserted into the ear canal, and in-ear headphones, sometimes referred to as canal phones, that are inserted in the ear canal itself. Thus, earphones can be another type of portable listening device that are configured to be positioned substantially within a user's ear. As used herein, the term "eartip", which can also be referred to as earmold, includes pre-formed, post-formed, or custom-molded sound-directing structures that at least partially fit within an ear canal. Eartips can be formed to have a comfortable fit capable of being worn for long periods of time. They can have different sizes and shapes to achieve a better seal with a user's ear canal and/or ear cavity.

Example Wireless Listening System

FIG. 1 is an example of a wireless listening system 100 according to some embodiments. System 100 can include a host device 110, a pair of portable wireless listening devices 130 and a charging case 150. Host device 110 is depicted in FIG. 1 as a smart phone but can be any electronic device that can transmit audio data to portable listening device 130. Other, non-limiting examples of suitable host devices 110 include a laptop computer, a desktop computer, a tablet computer, a smart watch, an audio system, a video player, and the like.

As depicted graphically in FIG. 1, host device 110 can be wirelessly communicatively coupled with portable wireless listening devices 130 and charging case 150 through wireless communication links 160 and 162. Similarly, portable wireless listening devices 130 can be communicatively coupled to charging case 150 via wireless communication link 164. Each of the wireless communication links 160, 162 and 164 can be a known and established wireless communication protocol, such as a Bluetooth protocol, a WiFi protocol, or any other acceptable protocol that enables electronic devices to wirelessly communicate with each other. Thus, host device 110 can exchange data directly with portable wireless listening devices 130, such as audio data, that can be transmitted over wireless link 160 to wireless listening devices 130 for play back to a user, and audio data that can be received by host device 110 as recorded/inputted from microphones in the portable wireless listening devices 130. Host device 110 can also be wirelessly communicatively coupled with charging case 150 via wireless link 162 so that the host device 110 can exchange data with the charging case, such as data indicating the battery charge level data for case 150, data indicating the battery charge level for portable wireless listening devices 130, data indicating the pairing status of portable wireless listening devices 130.

Portable wireless listening devices 130 can be stored within case 150, which can protect the devices 130 from being lost and/or damaged when they are not in use and can also provide power to recharge the batteries of portable wireless listening devices 230 as discussed below. In some embodiments portable wireless listening devices 130 can also be wirelessly communicatively coupled with charging case 150 via wireless link 164 so that, when the devices are worn by a user, audio data from case 150 can be transmitted to portable wireless listening devices 130. As an example, charging case 150 can be coupled to an audio source different than host device 110 via a physical connection, e.g., an auxiliary cable connection. The audio data from the audio source can be received by charging case 150, which can then wirelessly transmit the data to wireless listening devices 130. That way, a user can hear audio stored on or generated by an audio source by way of wireless listening devices 130 even though the audio source does not have wireless audio output capabilities.

According to some embodiments, each individual portable wireless listening device 130 can include a housing 132 formed of a body 134 and a stem 136 extending from body 134. Housing 132 can be formed of a monolithic outer structure. Body 134 can include an internally facing microphone 138 and an externally facing microphone 140 for purposes discussed herein. Externally facing microphone 140 can be positioned within an opening defined by portions of body 134 and stem 136. By extending into both body 134 and stem 136, microphone 140 can be large enough to receive sounds from a broader area around the user. In some embodiments, housing 132 can define an acoustic port 142 that can direct sound from an internal audio driver out of housing 132 and into a user's ear canal. In other embodiments, portable wireless listening devices 130 can include a deformable eartip that can be inserted into a user's ear canal enabling the wireless listening devices to be configured as in-ear hearing devices.

In the depicted embodiment, stem 136 has a substantially cylindrical construction along with a planar region 144 that does not follow the curvature of the cylindrical construction. Planar region 144 can indicate an area where the wireless listening device is capable of receiving user input. For instance, in some embodiments user input can be inputted by squeezing stem 136 at planar region 144. In some embodiments, planar region 144 can include a touch sensitive surface in addition to or instead of pressure sensing capabilities, that allow a user to input touch commands, such as contact gestures. Stem 136 can also include electrical contacts 146, 148 for making contact with corresponding electrical contacts in charging case 150, as will be discussed further herein.

As will be appreciated herein, portable wireless listening devices 130 can include several features can enable the devices to be comfortably worn by a user for extended periods of time and even all day. Housing 132 can be shaped and sized to fit securely between the tragus and anti-tragus of a user's ear so that the portable listening device is not prone to falling out of the ear even when a user is exercising or otherwise actively moving. Its functionality can also enable wireless listening devices 130 to provide an audio interface to host device 110 so that the user may not need to utilize a graphical interface of host device 110. In other words, wireless listening devices 130 can be sufficiently sophisticated that they can enable the user to perform day-to-day operations from host device 110 solely through interactions with wireless listening devices 130. This can create further independence from host device 110 by not requiring the user to physically interact with, and/or look at the display screen of, host device 110, especially when the functionality of wireless listening devices 130 is combined with the voice control capabilities of host device 110. Thus, wireless listening devices 130 can enable a true hands free experience for the user.

Figure 2:
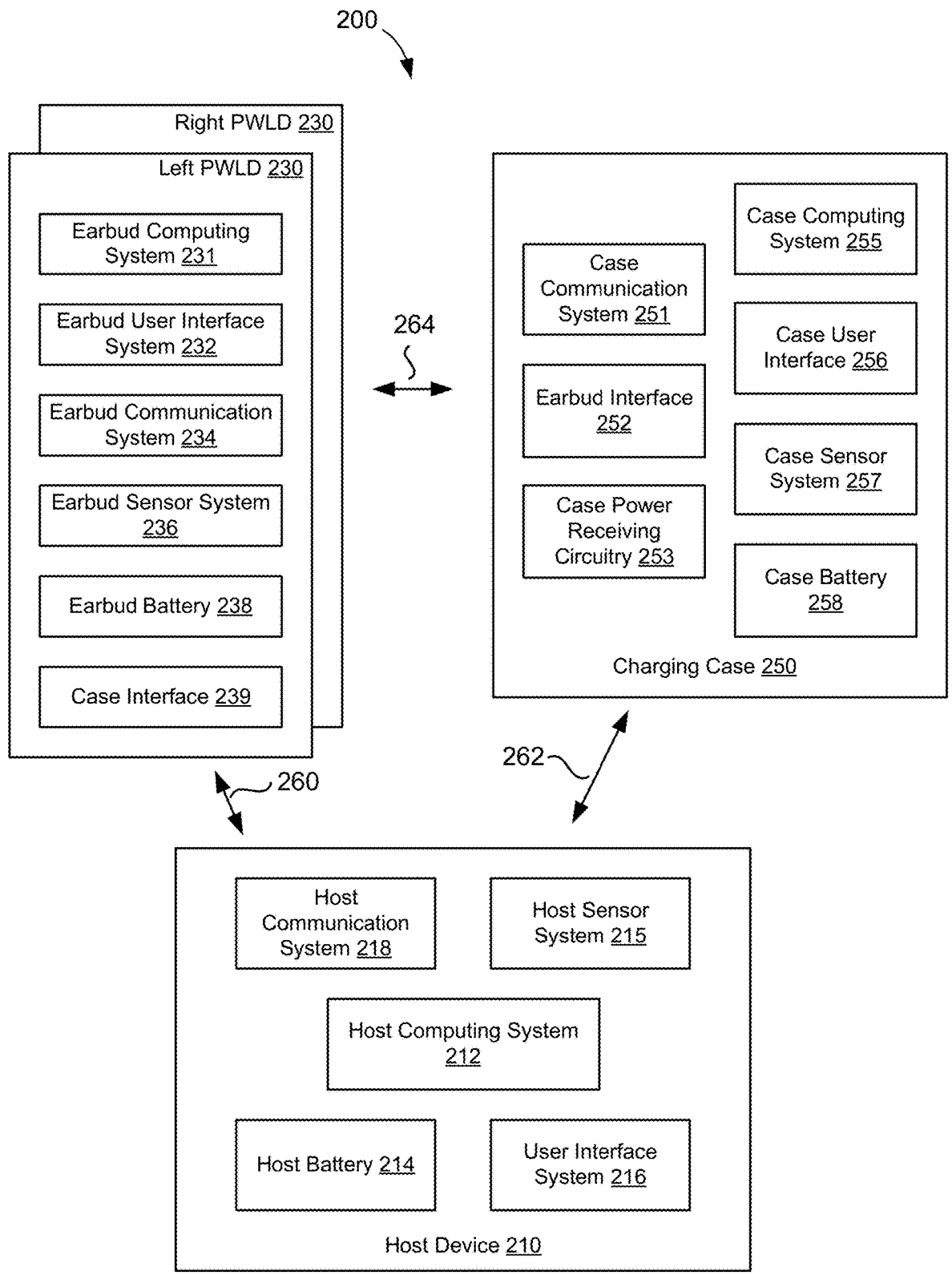
FIG. 2 is a simplified block diagram of various components of a portable wireless listening system according to some embodiments.

FIG. 2 is a simplified block diagram of various components of a wireless listening system 200 according to some embodiments that includes a host device 210, a pair of portable wireless listening devices (PWLDs) 230 (e.g., a right PWLD 230 and a left PWLD 230) and a charging case 250. System 200 can be representative of system 100 shown in FIG. 1 and host device 210, portable wireless listening devices 230 and charging case 250 can be representative of host device 110, portable wireless listening devices 130 and charging case 150, respectively. Each portable wireless listening device 230 can receive and generate sound to provide an enhanced user interface for host device 210. For convenience, the discussion below refers to a single portable wireless listening device 230, but it is to be understood that, in some embodiments, a pair of portable listening devices can cooperate together for use in a user's left and right ears, respectively, and each portable wireless listening device in the pair can include the same or similar components.

Portable wireless listening device 230 can include a computing system 231 that executes computer-readable instructions stored in a memory bank (not shown) for performing a plurality of functions for portable wireless listening device 230. Computing system 231 can be one or more suitable computing devices, such as microprocessors, computer processing units (CPUs), digital signal processing units (DSPs), field programmable gate arrays (FPGAs), application specific integrated circuits (ASICs) and the like.

Computing system 231 can be operatively coupled to a user interface system 232, communication system 234, and a sensor system 236 for enabling portable wireless listening device 230 to perform one or more functions. For instance, user interface system 232 can include a driver (e.g., speaker) for outputting sound to a user, one or more microphones for inputting sound from the environment or the user, one or more LEDs for providing visual notifications to a user, a pressure sensor or a touch sensor (e.g., a resisitive or capacitive touch sensor) for receiving user input, and/or any other suitable input or output device. Communication system 234 can include wireless and wired communication components for enabling portable wireless listening device 230 to send and receive data/commands from host device 210. For example, in some embodiments communication system 234 can include circuitry that enables portable wireless listening device 230 to communicate with host device 210 over wireless link 260 via a Bluetooth or other wireless communication protocol. In some embodiments communication system 234 can also enable portable wireless listening device 230 to wirelessly communicate with charging case 250 via wireless link 264. Sensor system 236 can include proximity sensors (e.g., optical sensors, capacitive sensors, radar, etc.), accelerometers, microphones, and any other type of sensor that can measure a parameter of an external entity and/or environment.

Portable wireless listening device 230 can also include a battery 238, which can be any suitable energy storage device, such as a lithium ion battery, capable of storing energy and discharging stored energy to operate portable wireless listening device 230. The discharged energy can be used to power the electrical components of portable wireless listening device 230. In some embodiments, battery 238 can be a rechargeable battery that enables the battery to be repeatedly charged as needed to replenish its stored energy. For instance, battery 238 can be coupled to battery charging circuitry (not shown) that is operatively coupled to receive power from charging case interface 239. Case interface 239 can, in turn, electrically couple with earbud interface 252 of charging case 250. In some embodiments, power can be received by portable wireless listening device 230 from charging case 250 via electrical contacts within case interface 239. In some embodiments, power can be wirelessly received by portable wireless listening device 230 via a wireless power receiving coil within case interface 239.

Charging case 250 can include a battery 258 that can store and discharge energy to power circuitry within charging case 250 and to recharge the battery 238 of portable wireless power listening device 230. As mentioned above, in some embodiments circuitry within earbud interface 252 can transfer power to portable wireless listening device 230 through a wired electrical connection between contacts in charging case 250 that are electrically coupled to contacts in portable wireless listening device 230 to charge battery 238. While case 250 can be a device that provides power to charge battery 238 through a wired interface with device 230 in some embodiments, in other embodiments case 250 can provide power to charge battery 238 through a wireless power transfer mechanism instead of or in addition to a wired connection. For example, earbud interface can include a wireless power transmitter coil that can couple with a wireless power receiving coil within portable wireless listening device 230.

Charging case 250 can also include a case computing system 255 and a case communication system 251. Case computing system 255 can be one or more processors, ASICs, FPGAs, microprocessors, and the like for operating case 250. Case computing system 255 can be coupled to earbud interface 252 and can control the charging function of case 250 to recharge batteries 238 of the portable wireless listening devices 230, and case computing system 255 can also be coupled to case communication system 251 for operating the interactive functionalities of case 250 with other devices, including portable wireless listening device 230. In some embodiments, case communication system 251 includes a Bluetooth component, or any other suitable wireless communication component, that wirelessly sends and receives data with communication system 234 of portable wireless listening device 230. Towards this end, each of charging case 250 and portable wireless listening device 230 can include an antenna formed of a conductive body to send and receive such signals. Case 250 can also include a user interface 256 that can be is operatively coupled to case computing system 255 to alert a user of various notifications. For example, the user interface can include a speaker that can emit audible noise capable of being heard by a user and/or one or more LEDs or similar lights that can emit a light that can be seen by a user (e.g., to indicate whether the portable listening devices 230 are being charged by case 250 or to indicate whether case battery 258 is low on energy or being charged).

Host device 210, to which portable wireless listening device 230 is an accessory, can be a portable electronic device, such as a smart phone, tablet, or laptop computer. Host device 210 can include a host computing system 212 coupled to a battery 214 and a host memory bank 134 containing lines of code executable by host computing system 212 for operating host device 210. Host device 210 can also include a host sensor system 215, e.g., accelerometer, gyroscope, light sensor, and the like, for allowing host device 210 to sense the environment, and a host user interface system 216, e.g., display, speaker, buttons, touch screen, and the like, for outputting information to and receiving input from a user. Additionally, host device 210 can also include a host communication system 218 for allowing host device 210 to send and/or receive data from the Internet or cell towers via wireless communication, e.g., wireless fidelity (WiFi), long term evolution (LTE), code division multiple access (CDMA), global system for mobiles (GSM), Bluetooth, and the like. In some embodiments, host communication system 218 can also communicate with communication system 234 in portable wireless listening device 230 via a wireless communication link 262 so that host device 210 can send audio data to portable wireless listening device 230 to output sound, and receive data from portable wireless listening device 230 to receive user inputs. The communication link 262 can be any suitable wireless communication line such as Bluetooth connection. By enabling communication between host device 210 and portable wireless listening device 230, wireless listening device 230 can enhance the user interface of host device 210.

Earbuds

Figure 3C:
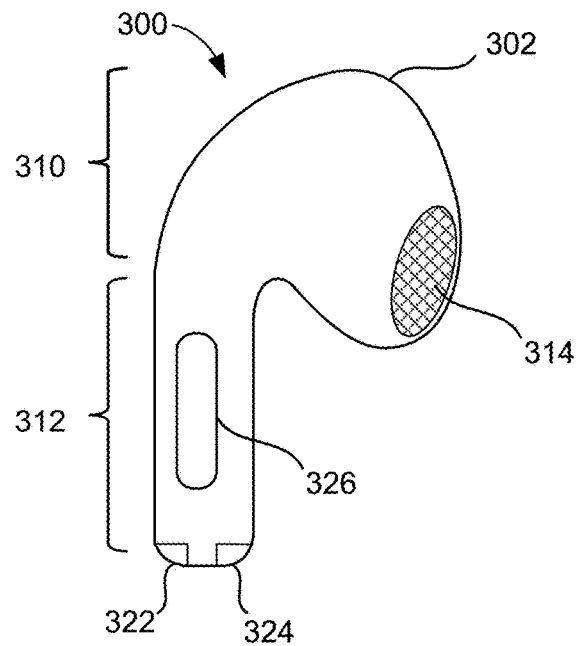
Figure 3C:
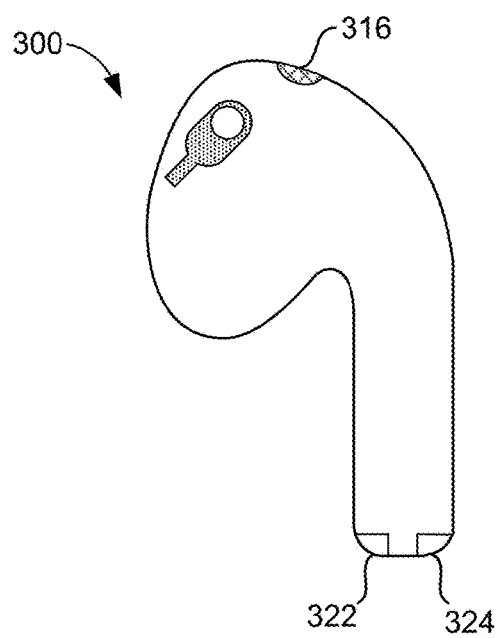
Figure 3C:
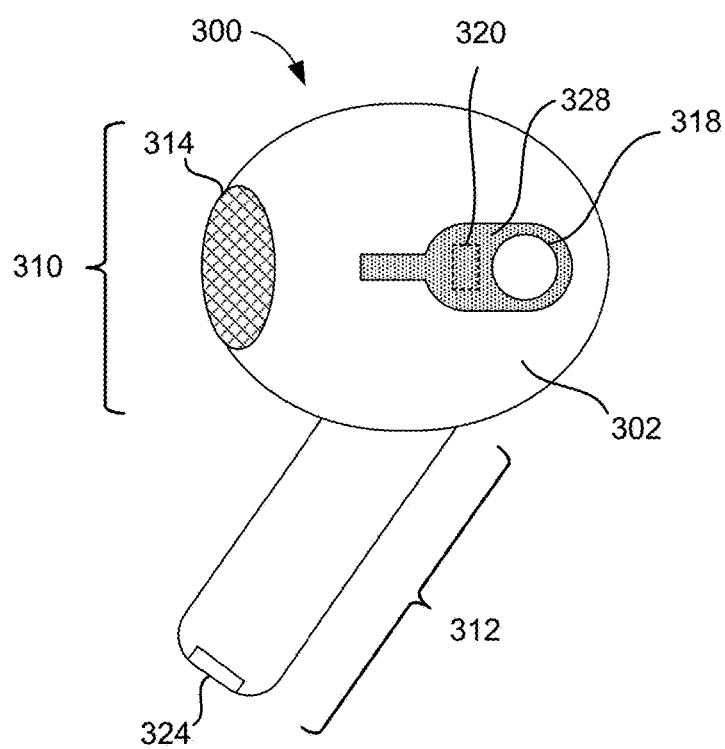

Portable wireless devices according to some embodiments can include a number of different features that provide a user with improved audio quality and a superior user experience as compared to many previously known portable wireless devices. To illustrate and explain some such features, reference is made to FIGS. 3A-3C, which are simplified views of a wireless earbud 300 according to some embodiments. Specifically, FIG. 3A is a simplified plan view of a first side of earbud 300, FIG. 3B is a simplified plan view of a second side, opposite the first side of earbud 300, and FIG. 3C is a simplified top view of earbud 300.

Earbud Housing

Earbud 300 includes a housing 302 that can be made from, for example, a hard radio frequency (RF) transparent plastic such as acrylonitrile butadiene styrene (ABS) or polycarbonate. In some embodiments, housing 302 can be made from one or more components that can be bonded together (e.g,. with tongue and groove joints and an appropriate adhesive) to form a monolithic housing structure with a substantially seamless appearance. Housing 302 forms a shell that defines an internal cavity in which the various components of earbud 300 are housed. As depicted housing 302 can include two primary sections: a speaker housing 310 and a stem 312 that protrudes away from the speaker housing at an angle. As discussed below, the cavity portion within speaker housing 310 can hold an audio driver and battery while the cavity portion within stem 312 can hold a primary circuit board and other electronics. In some embodiments, stem 312 can also include electrical contacts 322, 324 at the distal tip of the stem. Electrical contacts 322, 324 provide a physical interface that can be electrically coupled with corresponding electrical contacts in a corresponding charging case (e.g., charging case 150). It is to be understood that embodiments are not limited to the particular shape and format of the housing 302 depicted in FIGS. 3A-3C. For example, in some embodiments the housing does not include a stem or similar structure and in some embodiment an anchor or other structure can be attached to or extend away from the housing to further secure the earbud to a feature of the user's ear.

Earbud 300 can be configured to have an open, unsealed acoustic architecture that is sometimes referred to as a "leaky acoustic architecture". That is, in some embodiments earbud 300 does not include a deformable eartip that is included on canal phones and that is configured to be inserted into a user's ear canal to form an airtight seal between the eartip and the user's ear. Instead, speaker housing 310 can be sized and shaped to fit within a user's ear without being inserted into the ear canal and all acoustic air volumes within earbud 300 have a free flowing air path to the ambient.

Speaker housing 310 is the primary support mechanism for earbud 300 when the earbud is positioned within a user's ear and speaker housing 310 can be shaped to rest between a user's tragus and anti-tragus without putting unwanted pressure on the crus helix, which could lead to a source of discomfort when the earbud is engaged in a user's ear for a long period of time. Towards this end, speaker housing 310 is contoured to allow the speaker housing portion to sit deep within the space between the tragus and anti-tragus of a user's ear to form a pseudo seal (sometimes referred to as a passive seal) between the housing and user's ear even though earbud 300 is not a canal phone and does not include a deformable eartip that is inserted into the user's ear canal. The pseudo seal allows earbud 300 to have improved audio quality compared to other leaky architecture earbuds without creating potential pressure build-up within a user's ear that can be created by earbuds with deformable eartips and that some user's find uncomfortable.

Speaker housing 310 is further contoured such that certain surfaces of the housing are not in contact with any portion of an average user's ear. These non-contact portions provide locations for various features of earbud 300 including a primary acoustic port 314, a base port 316 and a control leak 318. Acoustic port 314 provides an acoustic pathway for sound generated by a driver (not shown in FIGS. 3A-3C) within speaker housing 310 to reach a user's ear canal. When earbud 300 is inserted in a user's ear, acoustic port 314 is positioned at a location that is generally not in physical contact with the user's ear and adjacent to but spaced slightly apart from the user's ear canal. In some embodiments acoustic port 314 can be covered by an acoustic membrane and mesh as described below.

Base port 316 can be an opening in speaker housing 310 that provides an acoustic pathway from the driver that allows air to flow easier within the acoustic pathway for low frequency sounds, e.g., bass sound waves that are lower than 20 Hz. For low frequency sounds, a driver may move a large volume of air as it generates sound waves. When it is easier for a driver to move air, the driver can achieve better sound quality. Thus, bass port 316 can provide an opening for the air to easily move out to, and be drawn in from, the atmosphere, thereby allowing earbud 300 to provide higher quality bass notes. Tuned bass port 316 can be configured to achieve a certain rate of airflow when the driver is operating. This rate of air flow can be altered by the shape and size of tuned bass port 316, which can be tuned in various ways according to design. As depicted in FIG. 3B, base port 316 can be positioned at a location that is generally not in physical contact with a user's ear when earbud 300 is worn.

Earbud 300 can also include a control leak 318 positioned at a location that is generally not in physical contact with a user's ear. Control leak 318 can be an opening within speaker housing 310 that allows air to flow out of housing 302. However, the result achieved by releasing the air out of housing 302 through the control leak 318 can be different from the result achieved by bass port 316. For instance, instead of improving bass sound quality, control leak 318 can provide an atmospheric pass-through between an outside environment and acoustic port 314 when earbud 300 is worn by a user so that speaker housing 310 does not completely seal the ear canal and trap pressure within the ear canal. This can allow for a more comfortable user experience and can also improve the acoustic performance of the listening device. Like bass port 316, control leak 318 can be configured to achieve a certain rate of airflow when pressure is built up in the ear canal. This rate of air flow can be altered by the shape and size of tuned control leak 318, which can be tuned in various ways according to design. Towards this end, control leak 318 can be a circular hole or be configured with any other shape, such as an ovular, oblong, rectangular, square-like, triangular, octagonal, and the like without departing from the spirit and scope of the present disclosure. It is to be appreciated that the specific positions of bass port 316 and control leak 318 can be chosen to minimize occlusion and acoustic coupling with other internal components. Also, in some embodiments control leak 318 and/or bass port 316 can be covered by an appropriate mesh to prevent moisture and contaminants from entering the internal cavity of speaker housing 310.

Earbud 300 can also include an optical sensor 320 that can be used to determine when the eartip has been inserted into an ear canal. Optical sensor 320 can be strategically positioned at a location along housing 302 that is likely to be in contact with or directly facing an inner surface of the average user's ears when the earbuds are worn by the user. In this manner, optical sensor 320 can be used, sometimes in conjunction with other sensors, to determine whether earbud 300 is worn by a user and positioned within the user's ear as discussed in more detail below. In some embodiments optical sensor 320 can be positioned behind an optically transparent window 328 that is positioned along speaker housing 310.

Battery

Figure 3D:
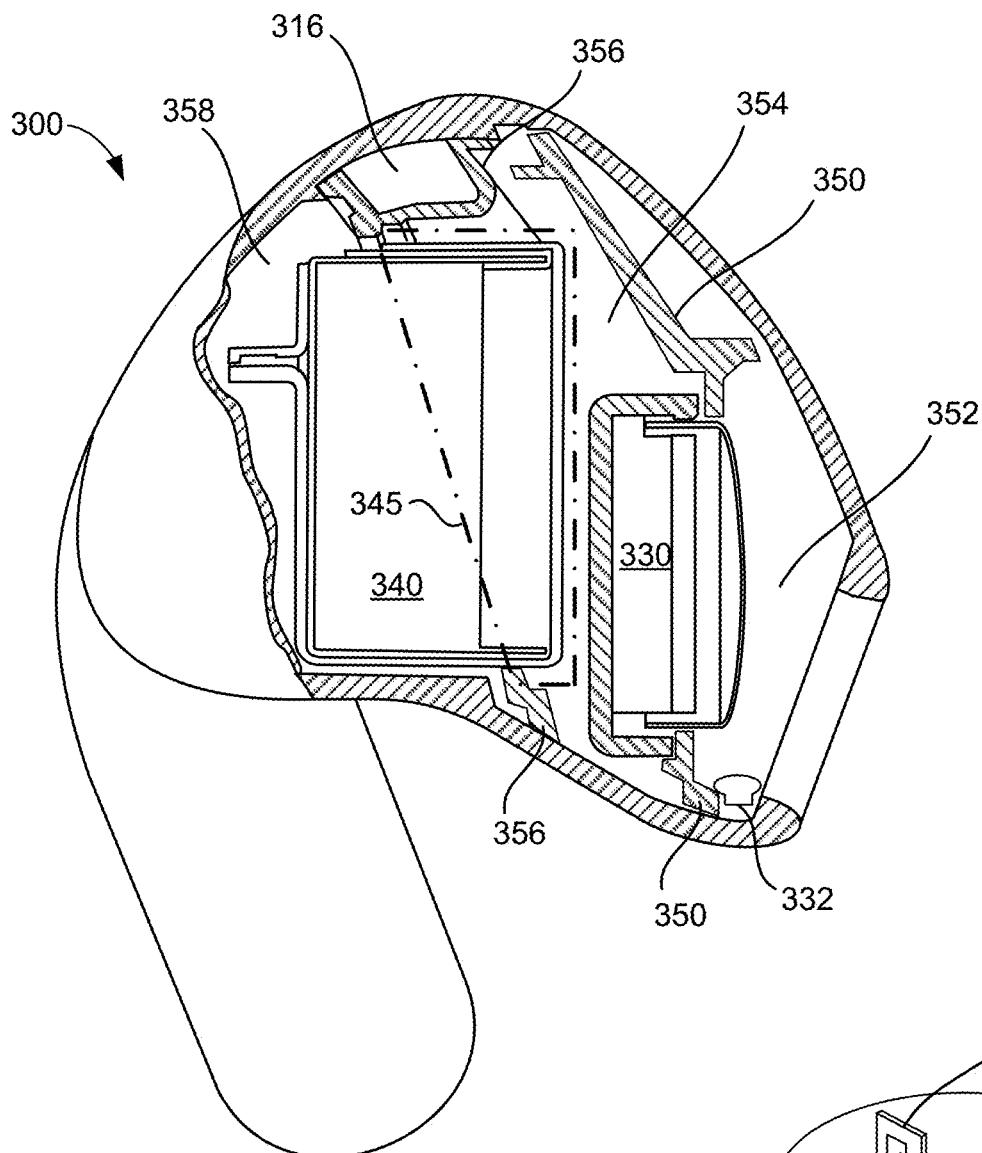
FIG. 3D is a simplified partial cross-sectional view of a speaker housing that illustrates the placement of select components within the earbud depicted in FIGS. 3A-3C according to some embodiments.

FIG. 3D is a partial cross-section of speaker housing 310 that illustrates the placement of select components within earbud 300. Specifically shown in FIG. 3D are audio driver 330 and battery 340 along with internal walls 350 and 356 that divide the interior portion of speaker housing 310 forming a front volume 352 and a back volume 354 for audio driver 330. Wall 356 further separates the back volume 354 from a non-acoustic volume 358 that extends from behind battery 340 within speaker housing 310 into the stem 312.

Figure 3E:
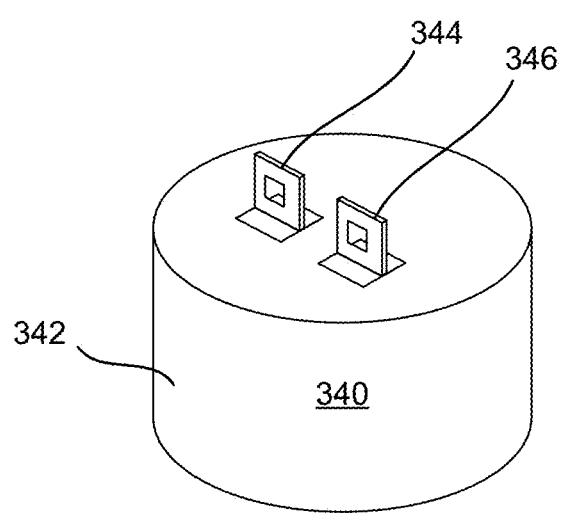
FIG. 3E is a simplified perspective view of a battery having a hydrophobic coating formed thereon according to some embodiments.

The embodiment depicted in FIG. 3D, does not include a wall that separates battery 340 from audio driver 330. Eliminating the wall allows battery 340 to be increased in size (and thus store more energy, which in turn enables earbud 300 to be powered for longer use times) but places battery 340 in the back volume 354 of driver 330 potentially exposing the battery to moisture ingress from the ambient (e.g., port 316 couples back volume 354 to the ambient). To protect the battery from potential corrosion, embodiments can coat battery 340 with a hydrophobic coating, such as parylene coating. FIG. 3E is a simplified perspective view of battery 340 having hydrophobic coating 342 formed thereon. In some particular embodiments, a type N parylene coating between 15-30 microns thick is deposited over the entire surface of battery 340 with the exception of the two battery contacts 344, 346, which can be masked during the coating process. In some embodiments, a second hydrophobic coating can be formed over the first coating on all or a portion of battery 340. The second coating can provide additional protection against moisture ingress to the battery and help prevent defects or holes that might be incurred in the first coating during an assembly stage. The second coating can be, for example, a polyurethane, a fluorochemical acrylic polymer or similar material, that can be spray coated over hydrophobic coating 342. In some embodiments the second coating can be between 12-30 microns thick and/or can be coated over only a portion of battery 340, such as portion 345 (designated in FIG. 3D by dotted lines) that faces back volume 354 and is in a region where the battery may be handled during assembly of earbud 300.

User-Specific Audio Settings

As mentioned above, speaker housing 310 of earbud 300 can be sized, shaped and contoured such, when earbud 300 is worn, the speaker housing 310 rests between the tragus and anti-tragus of a user's ear forming a passive seal with inner surfaces of the user's ear that surrounds the user's ear canal. When a relatively strong passive seal is formed, earbud 300 can be said to have a high quality fit as the passive seal can block noise from the outside environment providing an improved listening experience. Because user's ears can vary widely, however, the strength of the passive seal or whether or not a passive seal is formed, can vary between users. Depending on the strength of or the presence of a passive seal, certain frequencies of the audio signal can be adjusted to obtain a higher quality signal.

In some embodiments, earbud 300 includes an internal microphone 332 within the front volume of speaker housing 310. Microphone 332 can be tuned to listen to low frequencies in the front volume and electronics within earbud 300 (e.g., a processor) can detect a quality of the fit of the earbud within a user's ear and adjust the audio settings based on the fit quality. For example, if speaker housing 310 does not form a passive seal in a user's ear, the low frequency sound generated by driver 330 can be boosted to make up for the leaky fit of the earbud. If, on the other hand, speaker housing 310 forms a strong passive seal in a user's ear, the low frequency sound may not need to be boosted at all. In one particular implementation, earbud 300 can adjust audio settings (e.g., adjust the low frequencies of sound generated by driver 330) according to anyone of six different profiles depending on how strong or how leaky the fit is between speaker housing 310 and an individual user's ear. As an example, each of the six different profiles can have a different setting for bass and/or mid-range frequencies depending on the amount of bass picked up by microphone 332. In embodiments where earbud 300 is one of a left or a right earbud, each of the left and right earbuds can detect the strength of that earbud in the user's respective ear and adjust the frequency response of the earbud independent of the other earbud. As would be understood by a person of skill in the art, embodiments are not limited to any particular number of audio profiles and some embodiments can include fewer than six different profiles while other embodiments can include more than six profiles.

In-Ear Detect

As mentioned above, earbud 300 can include an optical sensor 320 that can be used to determine if the earbud is in a user's ear. Optical sensor 320 is positioned along a surface of earbud 300 that, when the earbud is worn by a user, faces the user's ear. Optical sensor 320 can include one or more emitters and one or more detectors. In some embodiments, the emitter can be a laser diode or a light emitting diode (LED) and the detector can be a photo diode.

Optical sensor 320 can emit radiation (e.g., infrared light) that, when it contacts a surface is reflected back to and detected by sensor 120. When earbud 300 is worn, the emitted radiation is reflected off the inner portion of a user's ear and detected by the detector within sensor 120. When it is determined that earbud 300 is positioned within a user's ear, audio can played through the earbud for the user's enjoyment. If, on the other hand, optical sensor 320 determines that the earbud is not in a user's ear, audio playback can be halted or otherwise stopped. To avoid false positives, optical sensor 320 can distinguish between scenarios in which the optical sensor is positioned adjacent to skin (i.e., the skin of user's ear) and scenarios in which the optical sensor is located next to a different material (e.g., a table top, fabric in a user's pocket, etc.) as described below.

The spectral response of human skin is characterized by peaks and valleys. For example, the reflectivity of human skin is relatively high (e.g., about 50-60%) at a wavelength of 1065 nm and is relatively low (e.g., about 5-10%) at a wavelength of 1465 nm. As a result, the presence of skin can be monitored by a sensor that emits light at 1065 nm and 1465 and that measures the amount of light reflected from a target object at these wavelengths. In some embodiments, optical sensor 120 includes two separate emitters that emit two different wavelengths of radiation that have different frequency responses to human skin. Thus, when reflected light emitted by sensor 120 is detected by the sensor, the ratio of the two wavelengths can be used to determine whether the surface that the radiation was reflected from was human skin or some other materials, such as a wood or metal table top. For example, when the ratio between the two wavelengths is within a certain range, sensor 320 can determine that the detected radiation was reflected off of human skin, which can in turn be used either alone or in conjunction with data from other sensors within earbud 300 (e.g., an accelerometer) to determine that earbud 300 is positioned in a user's ear.

Figure 3F:
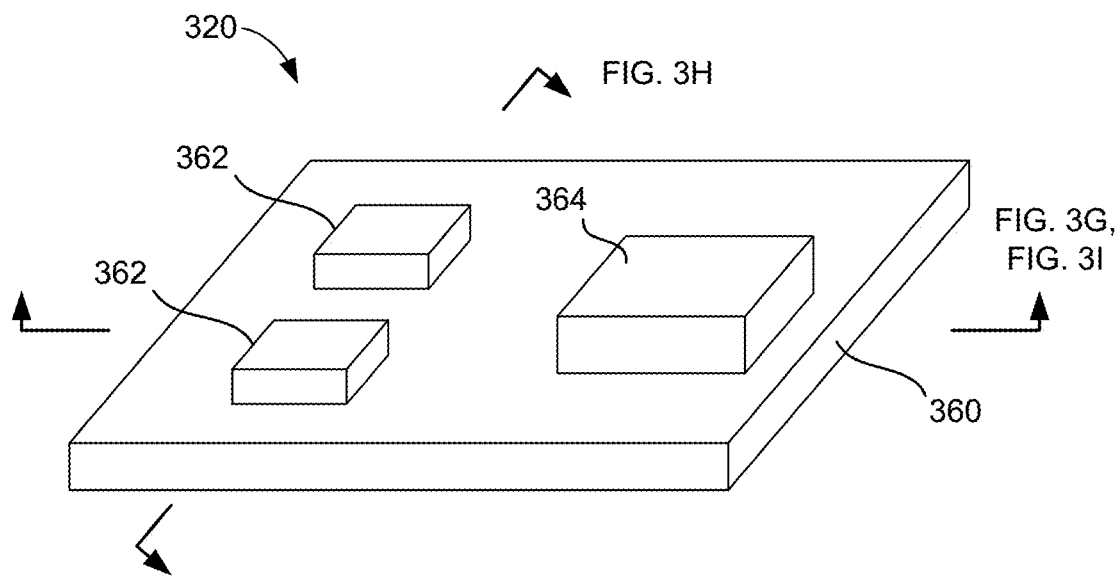
FIG. 3F is a simplified perspective view of an optical sensor according to some embodiments.
Figure 3G:
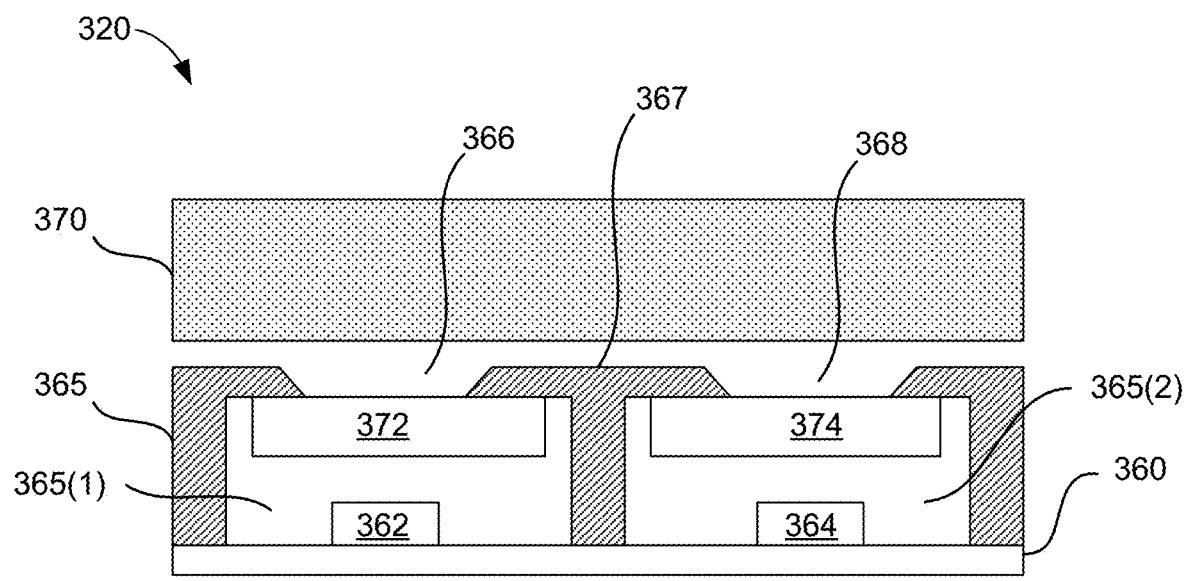
FIG. 3G is a simplified cross-sectional view of the optical sensor shown in FIG. 3F.

As an illustrative non-limiting embodiment, reference is made to FIGS. 3F and 3G which depict an embodiment of optical sensor 320. As shown in FIG. 3F, optical sensor 320 includes a circuit board 360 (e.g., a printed circuit board)

along with two light emitters 362 and a detector 364, all of which are mounted to circuit board 360. Light emitters 362 can be light emitting diodes and detector 364 can be a common photodiode, an avalanche photodiode (APD) or a collection of single photon avalanche diodes (SPADs). In other embodiments light emitters 362 can be lasers (e.g., vertical cavity surface emitting lasers referred to as "VCSELs") or other appropriate light emitting devices and detector 364 can be a phototransistor.

Circuit board 360 can be mounted in a sensor package 365 as shown in FIG. 3G. In some embodiments sensor package 365 includes various external and internal walls 367 that create two separate cavities spaced apart from, and optically isolated from, each other. Light emitters 362 can be positioned within a first cavity 365(1) while detector 364 can be positioned with a second cavity 365(2). An optical window 370 that is transparent to the wavelength of radiation emitted from light emitters 362 can be mounted (e.g., attached by a pressure-sensitive adhesive or other suitable mounting approach) to a top surface of sensor package 365 and package 365 can include first and second pass through regions 366, 368, spaced apart from and directly above the light emitters 362 and detector 364, respectively. Pass through regions 366, 368 can be, for example, openings formed through an exterior wall 367 of package 365. In some embodiments, first pass through region 366 can include two separate openings such that one of the two openings is spaced apart from and directly above each of the two light emitters 362.

As shown in FIG. 3F, sensor package 365 can also include first and second filters 372, 374. Filter 372 can be positioned in the optical path between light emitters 362 and first pass through region 366 while filter 374 can be positioned in the optical path between photodetector 366 and second pass through region 368. Each of the filters 372, 374 can be configured to allow a predetermined set of radiation wavelengths to pass through the filter while blocking radiation outside the predetermined set. The filters 372, 374 can also beneficially be used as mechanical barriers to isolate against contamination (liquid, dust, other ingress).

In some embodiments, each of filters 372, 374 can be band-pass filters. Since the two light emitters 362 emit radiation at different wavelengths, in some embodiments filter 372 can include first and second areas that pass different bands of radiation a corresponding to the emitted wavelength from light emitters 362. For example, in a configuration in which the two light emitters 362 emit radiation at 1065 nm and 1465 nm, respectively, filter 372 can include a band-pass filter in a first area that allows a first relatively narrow band of radiation centered at 1065 nm to pass while blocking radiation outside the first band and a band-pass filter in a second area that allows a second relatively narrow band of radiation centered at 1465 nm to pass while blocking radiation outside the second band.

Similarly, in some embodiments filter 374 can be configured to form a dual-band band-pass filter that includes first and second passbands at the same first and second wavelengths emitted by light emitters 362. Thus, filter 374 can be configured to only allow light emitted from the light emitters 362 and reflected back through window 370 into opening 368 to reach detector 364 while blocking light (including ambient light) at other wavelengths. To distinguish between measurements associated with the two different light emitters 362, in some embodiments the two light emitters 362 can emit radiation at different times (e.g., using time-division multiplexing). As an example, the two light emitters 362 can emit light in an alternating pattern. The measurements of detector 364 can then be synchronized to the emitted light pattern so that separate measurements for the first and second wavelengths can be made.

In one specific implementation, optical sensor includes two light emitters 362 in which one of the light emitters that emits light at a wavelength of 1065 nm and a second of the light emitters emits light at a wavelength of 1465 nm. The ratio R of reflected light at 1065 nm to reflected light at 1465 nm can be monitored and compared to a threshold level X (e.g., 2.0 or other suitable value). When the ratio R is less than X, it can be concluded that optical sensor 320 is not adjacent to human skin. When the ratio R is greater than X, it can be concluded that sensor 320 is adjacent to human skin.

Figure 3H:
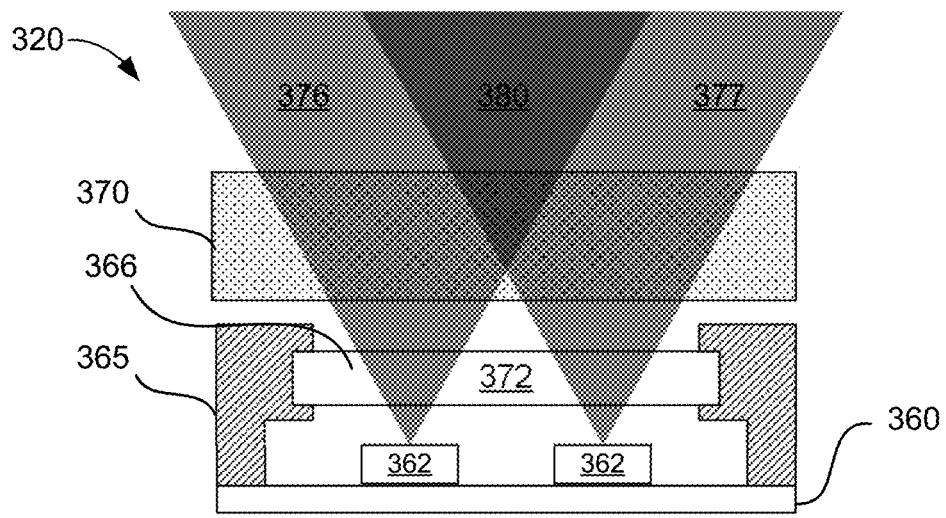
FIGS. 3H and 3I are simplified cross-sectional views of the optical sensor shown in FIGS. 3E and 3F illustrating the fields of view of the light emitters and photodetector in the sensor according to some embodiments.
Figure 3I:
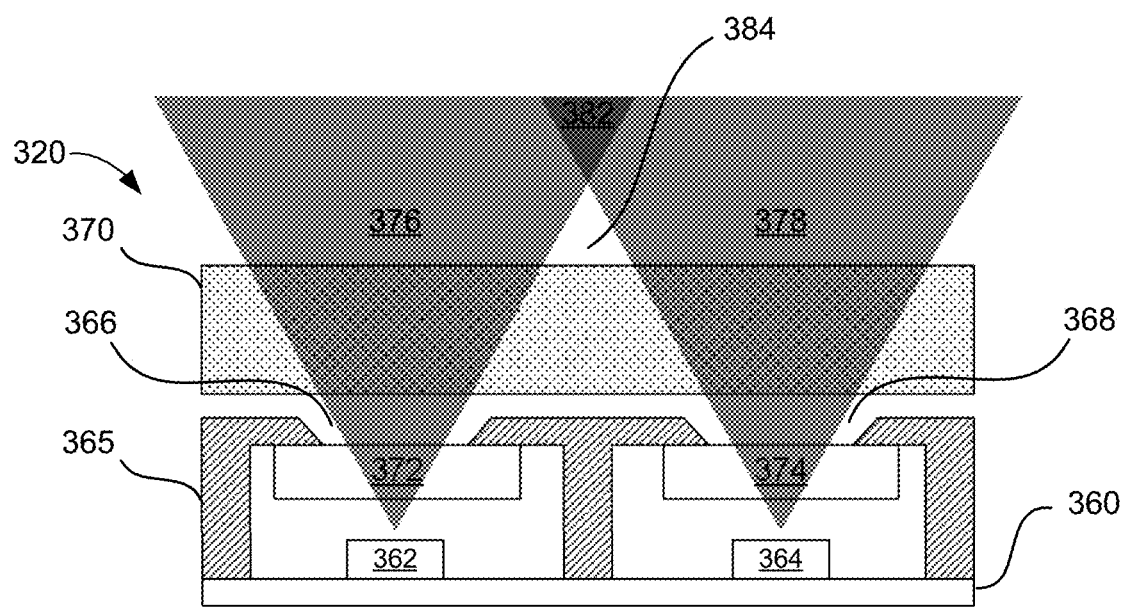

As shown in FIGS. 3G and 3H, light emitters 362 can be aligned to emit radiation through filter 372, through pass through 366 and through window 370, while detector 364 can be aligned to detect radiation that passes through window 370, into pass through 368 and through filter 374. Radiation emitted from light emitters 362 can be in the form of a light cone in which the radiation spreads out from each of light emitters 362 as it travels further from each emitter. Thus, the two light emitters 362 can emit light cones 376, 377, respectively. Similarly, the field of view (FOV) of detector 364 can be viewed as a cone 378 where the field gets larger with distance from the photodetector. In some embodiments light emitters 362 are aligned and configured to emit light cones 376, 377 that overlap in an area 380 (FIG. 3G). The light emitters and optical paths of sensor 320 are configured such that overlapping area 380 is present the distances at which skin of a user's ear is reasonably going to be positioned when the earbud that includes optical sensor 320 is worn. The FOV of detector 364 is configured such that it overlaps with the light cones 376 and 378 of the light emitters 362 in an area 382 at a distance at which skin of a user's ear is reasonably going to be positioned when the earbud that includes optical sensor 320 is worn but is non-overlapping in an area 384 creating a FOV gap immediately adjacent to an outer surface of window 370 (FIG. 3H). In this manner, photodetector 362 is configured and aligned to detect radiation that is emitted from light detectors 362, reflected off a user's ear back to detector 364.

Force Sensor

A force sensor can be positioned along stem 312 to allow a user to control various aspects of earbuds 300. In some embodiments, the force sensor (not visible in any of FIGS. 3A-3C) can be disposed within stem 312 adjacent to a planar region 326 on the stem. A user can provide input through the force sensor by squeezing stem 312 at the planar region 326. Planar region 326 provides convenient tactile feedback to a user in locating the user input region provided by the force sensor. A person of skill in the art will appreciate that planar region can be replaced by or enhanced by one or more other features that provide additional and/or improved tactile feedback including, as examples, bumps, grooves, recesses, etc.

Figure 4A:
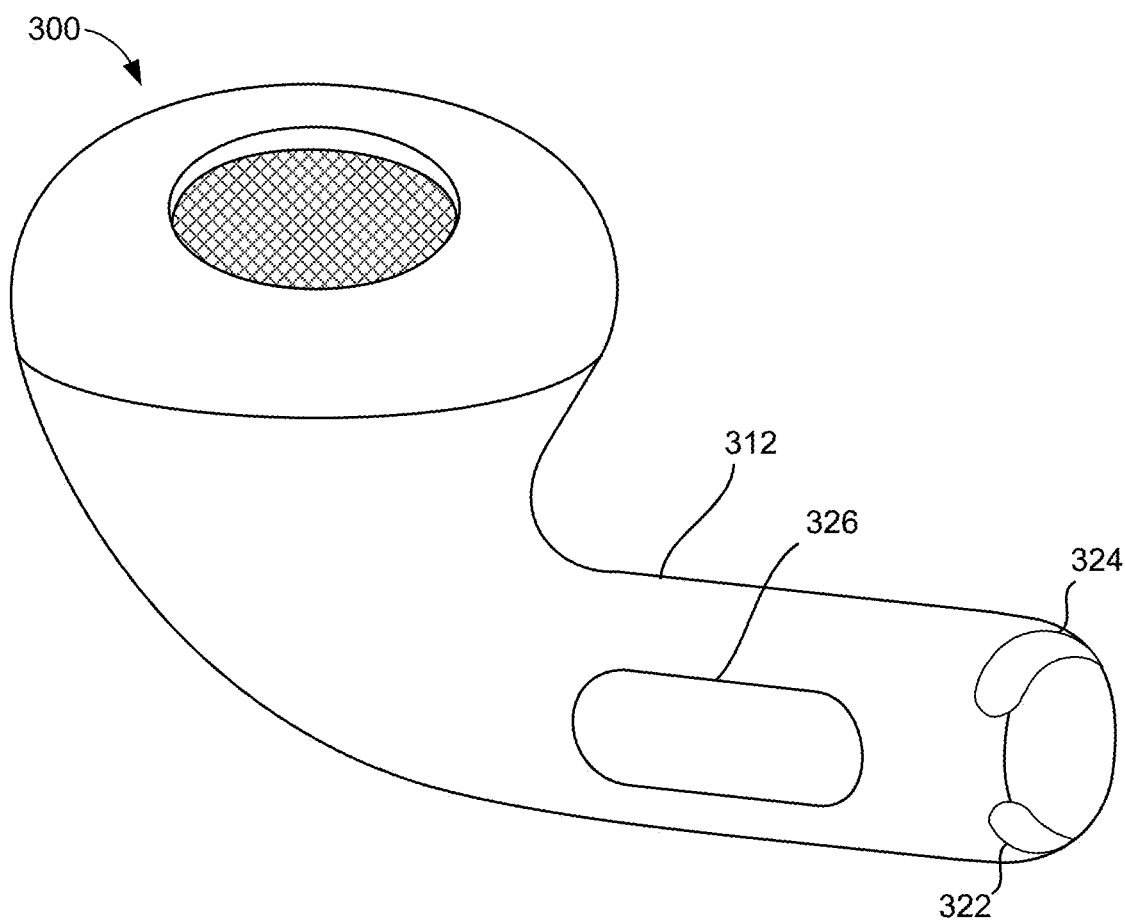
FIG. 4A is a simplified side view of the earbud depicted in FIGS. 3A-3C.
Figure 4B:
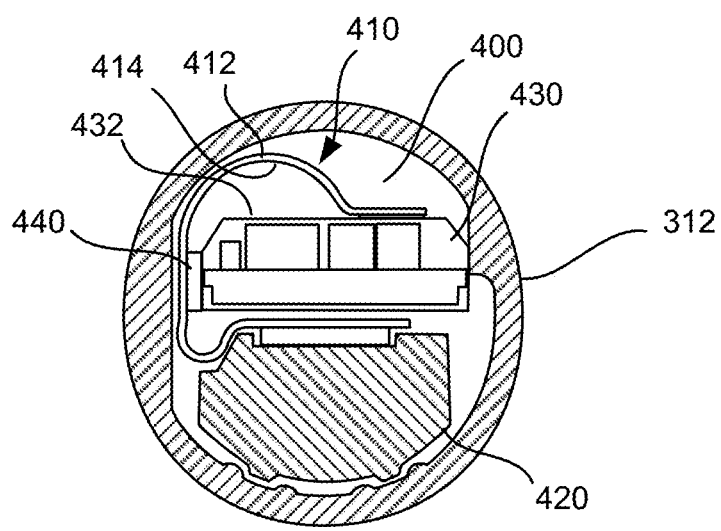
FIG. 4B is a simplified cross-sectional view of the earbud depicted in FIG. 4A taken through a portion of the earbud stem.
Figure 4C:
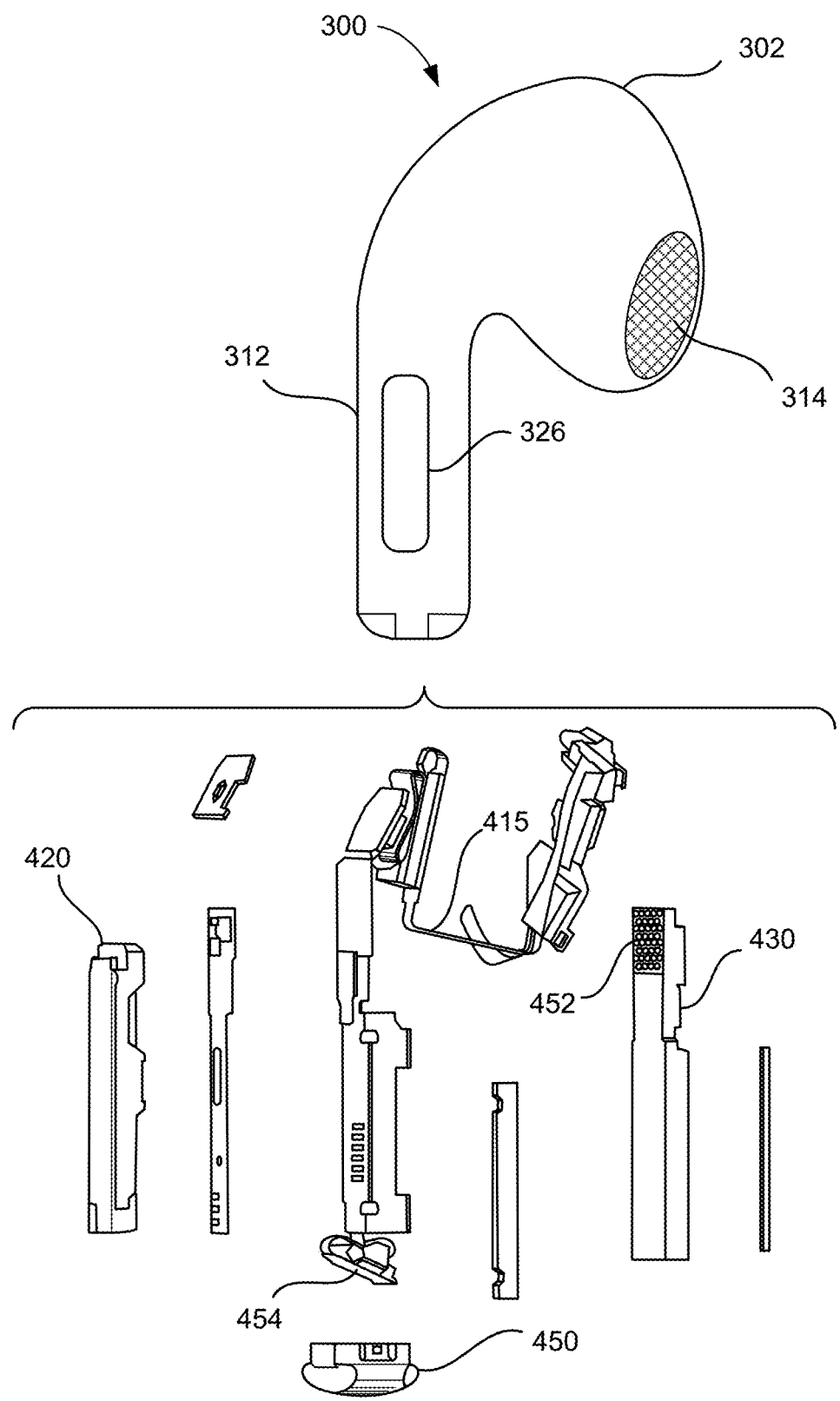
FIG. 4C is a simplified exploded view of various components positioned within the stem portion of an earbud according to some embodiments.

Further details of the force sensor are explained with reference to FIGS. 4A to 4C where FIG. 4A is a side view of earbud 300, FIG. 4B is a simplified cross-sectional view of earbud 300 taken through a portion of stem 312, and FIG. 4C is an exploded view of some of the components that fit within stem 312. Planar region 326 of stem 312 is clearly visible in FIG. 4A, and as discussed above, the planar region provides a visual and tactile indication to a user that defines a pressure-sensitive zone where earbud 300 accepts user input by squeezing stem 312.

Stem 312 defines an interior cavity 400 extending along a length of the stem in which components of earbud 300 are positioned. As shown in FIG. 4B, a force sensor 410, an antenna 420, and a system in a package (SIP) 430 can be positioned within cavity 400. Antenna 420 can extend along a majority of a length of stem 312 and SIP 430 can be positioned in an opposing relationship with the antenna. Force sensor 410 can include a full loop flex 412 that has a first side directly biased against an interior surface of stem 312 and a second side facing SIP 430. A conductive coating 414 or other conductive element contained within or laminated to flex 412, which serves as a first of two electrodes of the force sensor, can be formed at the second side (e.g., the copper layers already within the flex can act as an electrode). An outer portion 432 SIP 430 can be coated with a thin metal layer to serve as the second of the pair of electrodes for force sensor 410. Flex loop 412 wraps around SIP 430 and is separated from a sidewall of the SIP by a foam insert 440. When a user squeezes stem 312 in the planar region 326, the flex 412 is pushed toward SIP 430 and the gap between the two electrodes 414, 432 is reduced creating a change in capacitance that can be detected generating a user-input signal that can be acted upon by electronics within earbud 300 to carry out a predetermined function. For example, in some embodiments squeezing stem 312 can initiate a voice-activated, virtual assistant, such as Siri that is built into various Apple products, and/or activate play, pause, skip and/or back functions to control an audio stream played over earbud 300.

In some embodiments, touch pixels can be formed on the side of flex 412 that faces the interior wall of stem 312 enabling the planar region 326 to be used as both a touch surface and a force sensitive region. For example, the touch pixels can be built into copper layers formed in flex 412.

As shown in FIG. 4C, in some embodiments SIP 430 can fit entirely within the cavity defined by stem 312. SIP 430 can include a contact region 452 and circuitry (not visible in FIG. 4C), including one or more integrated circuits, that control much of the operation of earbud 300 and are overmolded. For example, in some embodiments SIP 430 can include a main processor that controls the operation of earbud 300, charging circuitry, an accelerometer, a wireless communication controller, support components for antenna 420, uplink and downlink communication circuitry and user-interface circuitry, among others. Moving the SIP and its associated circuitry to the stem portion 312 of earbud 300 enables speaker housing 310 to be smaller than it otherwise would be (while including an appropriate sized battery) thus enabling the speaker housing to fit more comfortably in a user's ear for an improved user experience.

Also shown in FIG. 4C is cap 450 that is part of overall housing 302 and can be affixed to an end of stem 312 forming a water tight seal with the stem. A bottom microphone 454 can be attached to an interior surface of cap 450 and the cap include an acoustic port (not shown) that allows the microphone to capture sounds from the environment. Cap 450 can also include two seats along its external surface on opposite sides of the cap for the two contacts 322, 324. Seats are recessed a sufficient amount such that the contacts 322, 324 can be secured to the seats and positioned flush with an outer surface of cap 450 creating a smooth, seamless structure that has an improved appearance and reliability. An electrical connection to circuitry within stem 312 can be made to each of contacts 322, 324 through an appropriate cutout or opening cap 312 that can be covered by the contacts.

Acoustic Port Mesh

Earbud 300 can include a mesh that covers acoustic opening 314 to prevent dust and debris from entering housing 302. In some embodiments the mesh can be formed as a multi-layered structure including a cosmetic mesh and an acoustic mesh where the cosmetic mesh forms an outer surface of earbud 300 and is formed of an interlaced network of stiff wire, while the acoustic mesh is positioned within acoustic port 314 beneath the cosmetic mesh and is formed of a porous fabric. As a specific non-limiting example, the cosmetic mesh can be formed of interlaced stainless steel and the acoustic mesh can be formed of polyester.

Because earphones are worn directly in a user's ear, earphones are susceptible to a build-up or collection of wax that can collect within the acoustic port between a speaker driver and a user's ear canal. Such wax build-up can muffle or otherwise adversely impact the sound quality of an earphone. In some embodiments, earbud 300 can include a wax gutter that sits adjacent to but outside the acoustic zone of the earbuds and collects ear wax so that the ear wax does not interfere with the sound quality of the earbuds.

Figure 5A:
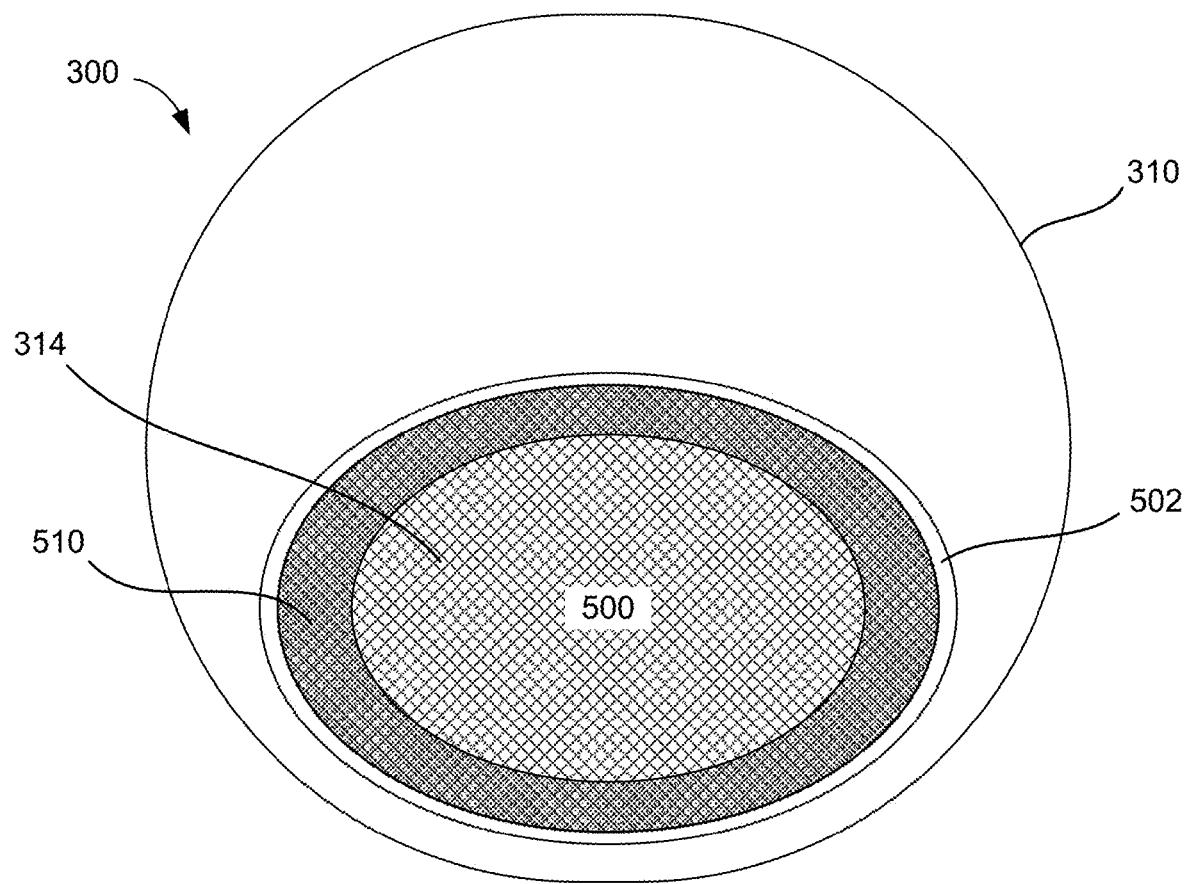
FIG. 5A is a simplified partial view of the earbud depicted in FIGS. 3A-3C (without the stem) looking towards an acoustic port.
Figure 5B:
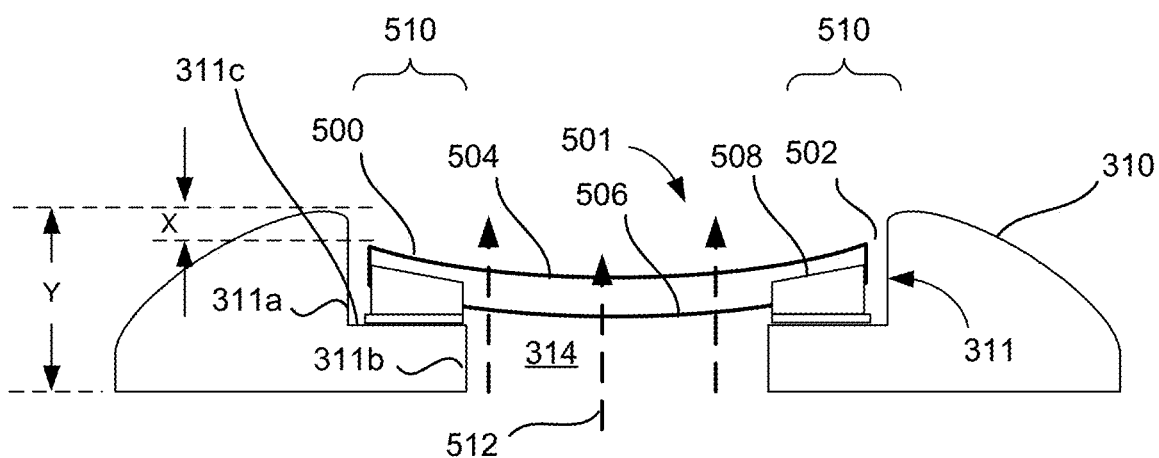
FIG. 5B is a simplified cross-sectional view of the earbud shown in FIG. 5A taken through the acoustic port.

An embodiment of earbuds 300 that includes a wax gutter is shown in FIGS. 5A and 5B where FIG. 5A is a simplified partial view of an earbud 300 (without stem 312) looking towards acoustic port 314 and FIG. 5B is a simplified cross-sectional view of earbud 300 taken through acoustic port 314. In some embodiments acoustic port 314 can be formed as a cutout through a wall 311 of speaker housing 310. As shown in FIG. 5B, wall 311 has a thickness of Y and can include first and second edges 311a, 311b separated by a shelf 311c. Edges 311a, 311b can extend around an entire perimeter of acoustic port 314 and the acoustic port can include an opening 501 at the exterior surface of speaker housing 310 that is defined by edge 311a.

As shown in FIGS. 5A and 5B, earbud 300 can include a multilayer mesh 500 disposed within primary acoustic port 314 and extending over a cross-section of the acoustic port. Mesh 500 can include an outer cosmetic mesh 504 and a separate acoustic mesh 506. Mesh 500 can be coupled to speaker housing 310 by an annular support 508 and can be positioned to span across the entirety of acoustic port 314. Earbud 300 can include an acoustic dead zone 510 that surrounds an outer periphery of acoustic port 314. Dead zone 510 includes wax gutter 502, which is gap or space formed between an inner edge of speaker housing 310 and mesh 500, along with the area occupied by support 508. During use of earbuds 300, ear wax can collect in wax gutter 502. Then, as additional ear builds-up on earbud 300, the wax can start to spread away from gutter 502 into acoustic dead zone 510. The combination of was gutter 502 and acoustic dead zone 510 allows an amount of ear wax to collect on earbud 300 without adversely impacting the sound quality of the earbud.

To further reduce ear wax build-up, in some embodiments mesh 500 is recessed within acoustic port 314 such that mesh 500 is spaced a distance X from the opening 501 at the exterior surface of speaker housing 310 in order to space the mesh further away from a user's ear. In some embodiments, X can be between 0.3 and 2.0 mm and in some embodiments X can be between 0.5 and 1.0 mm.

In the embodiment depicted in FIG. 5B, mesh 500 is shown as having a concave profile in which the center of mesh 500 is recessed further within acoustic port 314 than the outer edges of mesh 500. In some embodiments, however, mesh 500 can have a convex shape in which the center of mesh 500 is still recessed within acoustic port 314 but is recessed than the outer edges of mesh 500. The convex shape can help keep earwax build-up within the acoustic deadzone 510 and away from interfering with audio waves 512 directed acoustic port 314.

Figure 5C:
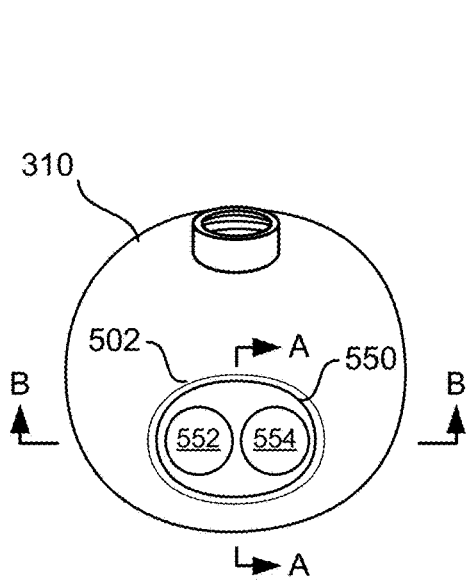
FIG. 5C is a simplified illustration of a speaker housing portion of an earbud that includes a multilayer mesh having a convex profile according to some embodiments.

FIG. 5C is a simplified illustration of speaker housing 310 that includes a multilayer mesh 550 that has a convex profile according to some embodiments. For ease of illustration, speaker housing 310 is depicted in FIG. 5C without stem 312. As shown in FIG. 5C, wax gutter 502 surrounds multilayer mesh 550 and the multilayer mesh has two side-by-side openings 552, 554 rather than a single opening.

Figure 5D:
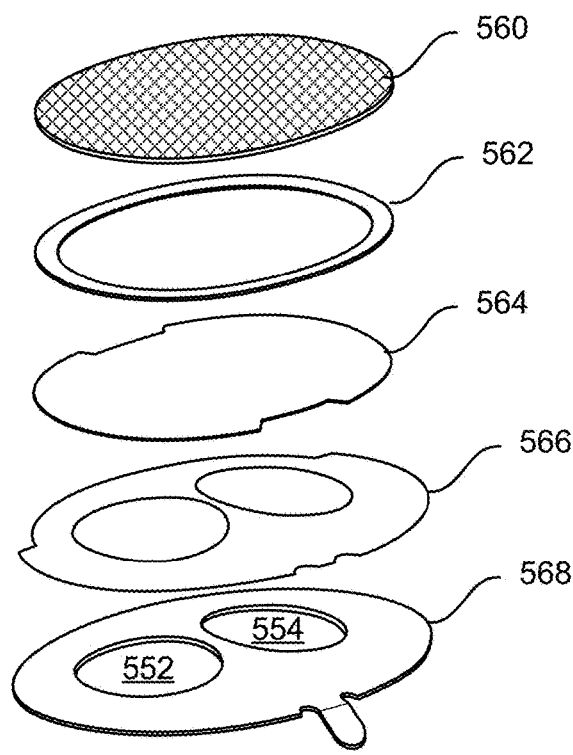
FIG. 5D is a simplified exploded view of the multilayer mesh shown in FIG. 5C according to some embodiments.

FIG. 5D is a simplified exploded view of multilayer mesh 550 that can be disposed over acoustic port 314 according to some embodiments. Similar to mesh 500, multilayer mesh 550 can include an outer cosmetic mesh 560 and a separate acoustic mesh 564. A stiffener 568 made out of a rigid material can provide additional structure to the mesh and can define the side-by-side openings 552, 554 that allow sound to exit the earbuds from acoustic port 314. Acoustic mesh 564 can be adhered to stiffener 568 by an adhesive 566. Similarly, cosmetic mesh 560 can be adhered to acoustic mesh 564 by an adhesive 562. In some embodiments, one or both of adhesives 562, 566 can be a thin flexible pressure sensitive adhesive (PSA) layer.

Figure 5E:
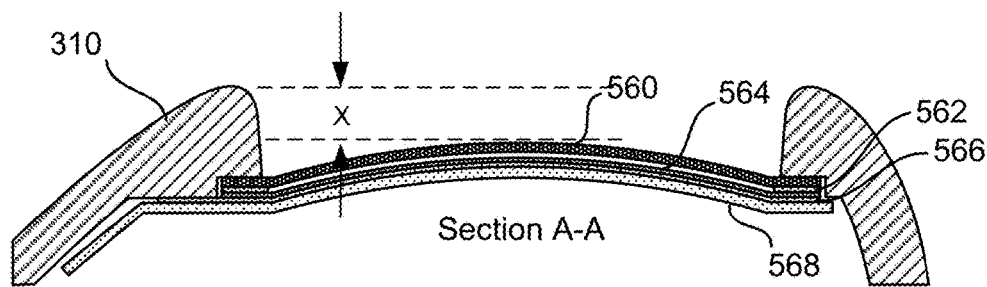
FIG. 5E depicts two separate cross-sections of the multilayer mesh shown in FIGS. 5C and 5D taken through lines A-A and lines B-B shown in FIG. 5C, respectively.
Figure 5E:
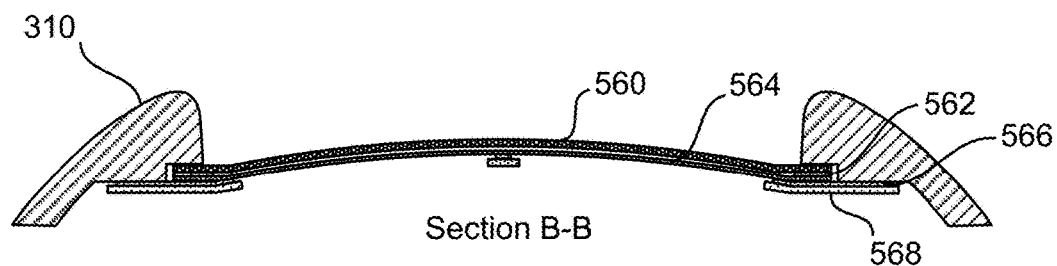

FIG. 5E depicts two separate cross-sections of multilayer mesh 550 taken through lines A-A and lines B-B shown in FIG. 5C, respectively. As shown in FIG. 5E, mesh 550 can have a convex shape such that the edges of the mesh are spaced further away from the exterior surface of speaker housing 310 than the central portion of the mesh. The central portion of mesh 550 can still be recessed from the exterior surface of speaker housing 310 by a distance X, which in some embodiments can be between 0.3 and 1.5 mm and in some embodiments X can be between 0.5 and 1.0 mm.

Charging Case

Some embodiments of the disclosure pertain to a charging case that can store and charge a portable wireless listening device or a pair of portable wireless listening devices, such as a pair of earbuds 300. The charging case can protect the wireless listening devices from physical damage as well as provide a source of power for charging the wireless listening devices.

Figure 6A:
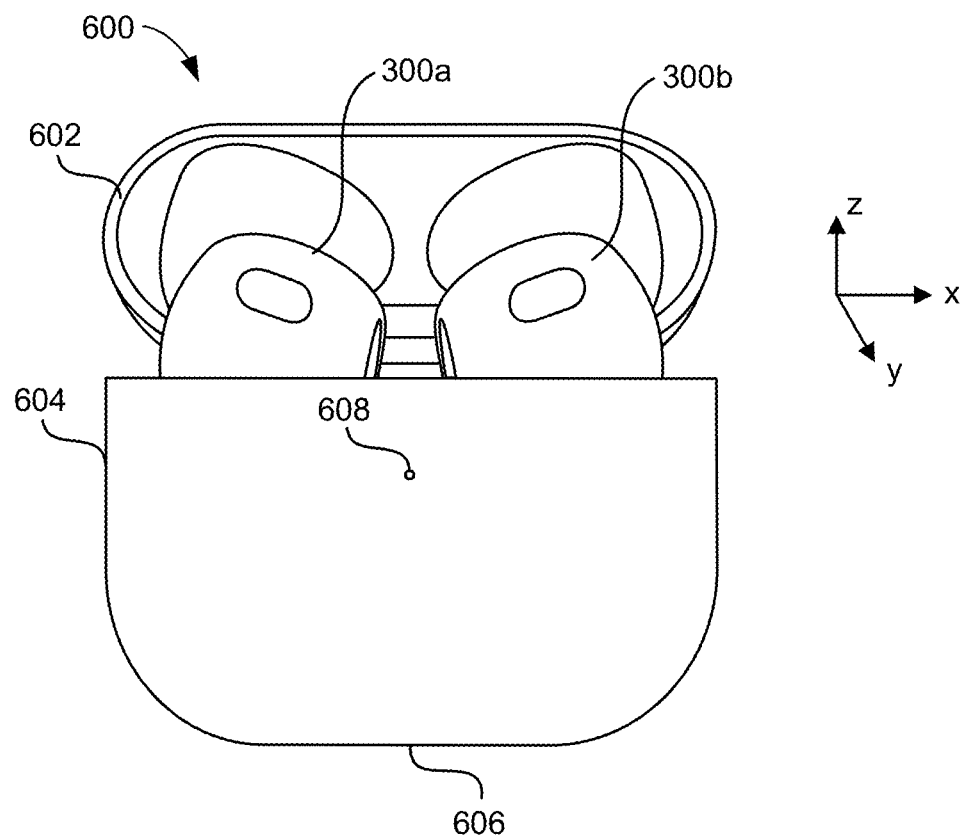
FIGS. 6A-6C are simplified plan views of a charging case that can store a pair of earbuds, such as the earbuds depicted in FIGS. 3A-3C, according to some embodiments.
Figure 6B:
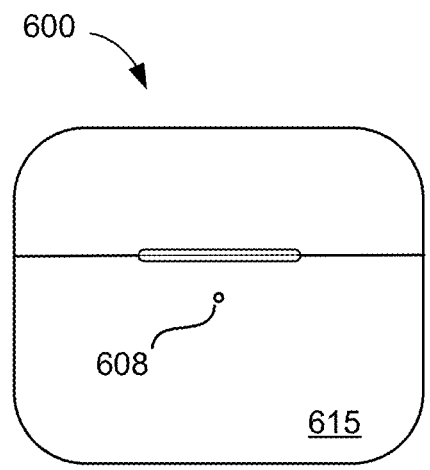
Figure 6C:
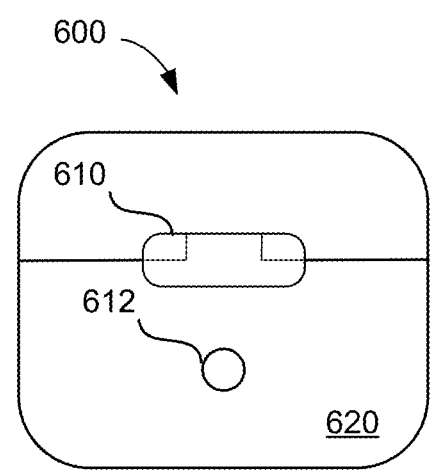

FIGS. 6A-6C are simplified plan views of a charging case 600 that can store a pair of earbuds, such as earbuds 300, according to some embodiments of the present disclosure. As shown in each of FIGS. 6A-6C, case 600 can include a lid 602 and a body 604 that forms an internal cavity for housing a pair of wireless listening devices 300a, 300b that can be worn in a user's left and right ears, respectively. FIGS. 6A and 6B are front plan views of charging case 600 and FIG. 6C is a rear plan view of the charging case. Charging case 600 is depicted in FIG. 6A with lid 602 in an open position while FIGS. 6B and 6C depict the charging case with the lid in a closed position. Lid 602 can be attached to body 604 by a hinge 610 (shown in FIG. 6C) that enables the lid to be moved between an open position (in which the earbuds 300a, 300b can be inserted into or removed from case 600) and a closed position (in which the lid 602 covers the earbuds 300a, 300b thereby completely enclosing the earbuds within the charging case 600).

In some embodiments, charging case 600 can include an internal frame (not visible in any of FIGS. 6A-6C) including portions designed to provide contours and surface features against which wireless listening devices 300a, 300b can rest in strategic positions discussed herein to minimize the size of case 600. Details of an exemplary internal frame according to some embodiments are discussed below.

To minimize the overall size of charging case 600, earbuds 300a, 300b can be positioned at strategic angles when placed in case 600. In some embodiments, each stem of the earbuds 300a, 300b is positioned at an angle with respect to two axis: an x-axis and a y-axis, instead of being positioned substantially vertically within the charging case. For purposes of description, the x-axis runs between earbuds 300a, 300b, the y-axis runs between the front and the back of charging case 600, and the z-axis runs between the bottom of body 604 and the top of lid 602.

Case 600 can be configured to charge wireless listening devices 300a, 300b when they are housed in case 600. Towards this end, in some embodiments case 600 can include two pairs of electrical contacts (not visible in FIGS. 6A-6C) for making electrical contact with respective contacts on the stems of each earbud so that charge can flow from an internal battery (not shown) of case 600 to internal batteries of the earbuds 300a, 300b. The charging case internal battery can be charged by an external power supply that is electrically coupled to case 600 via a connector 606. Connector 606 can be any appropriate physical connector interface, such as a lightning connector port developed by Apple, a USB-C port, a mini USB port or the like. In some embodiments charging case 600 also includes a wireless power receiving coil (not shown) to wirelessly receive power that can be used to charge the internal battery as discussed in more detail below.

In some embodiments charging case 600 is highly resistant to moisture ingression and can be designed to meet IPX4 water resistance standards. Towards this end, electrical components within case 600 (e.g., the charging case battery, the circuit board on which the processor and other electronic circuitry that controls the operation of the charging case, etc.) can be sealed within an internal system volume that is sealed with external system seals. Additionally, each electrical component can be sealed individually with a conformal coating or adhesive. Some embodiments can further include a barometric vent within the connector 606 module that is permeable to air but not liquids. The barometric vent allows charging case 600 to be tested, in the manufacturing line, immediately after manufacture of the case is completed to determine if the charging case is fully sealed in accordance with the manufacturer expectations, for example, in accordance with the IPX4 requirements.

Case 600 can also include a visual indicator 608 configured to emit different colors of light. Visual indicator 608 can change colors depending on the charge status of the case. As an example, indicator 608 can emit green light when the case is charged, emit orange light when the charging case battery is charging and/or when the charging case battery has less than a full charge, and red light when the charging case battery is depleted. When viewed from outside of case 600, visual indicator 608 can have a circular shape, or any other suitable shape, such as square-like, rectangular, oval, and the like. Case 600 can also include a user-interface 612, such as a button, that when activated and when the earbuds are stored within case 600 with lid 602 open, initiates a pairing routine that allows the earbuds to be paired with a host device.

Figure 11:
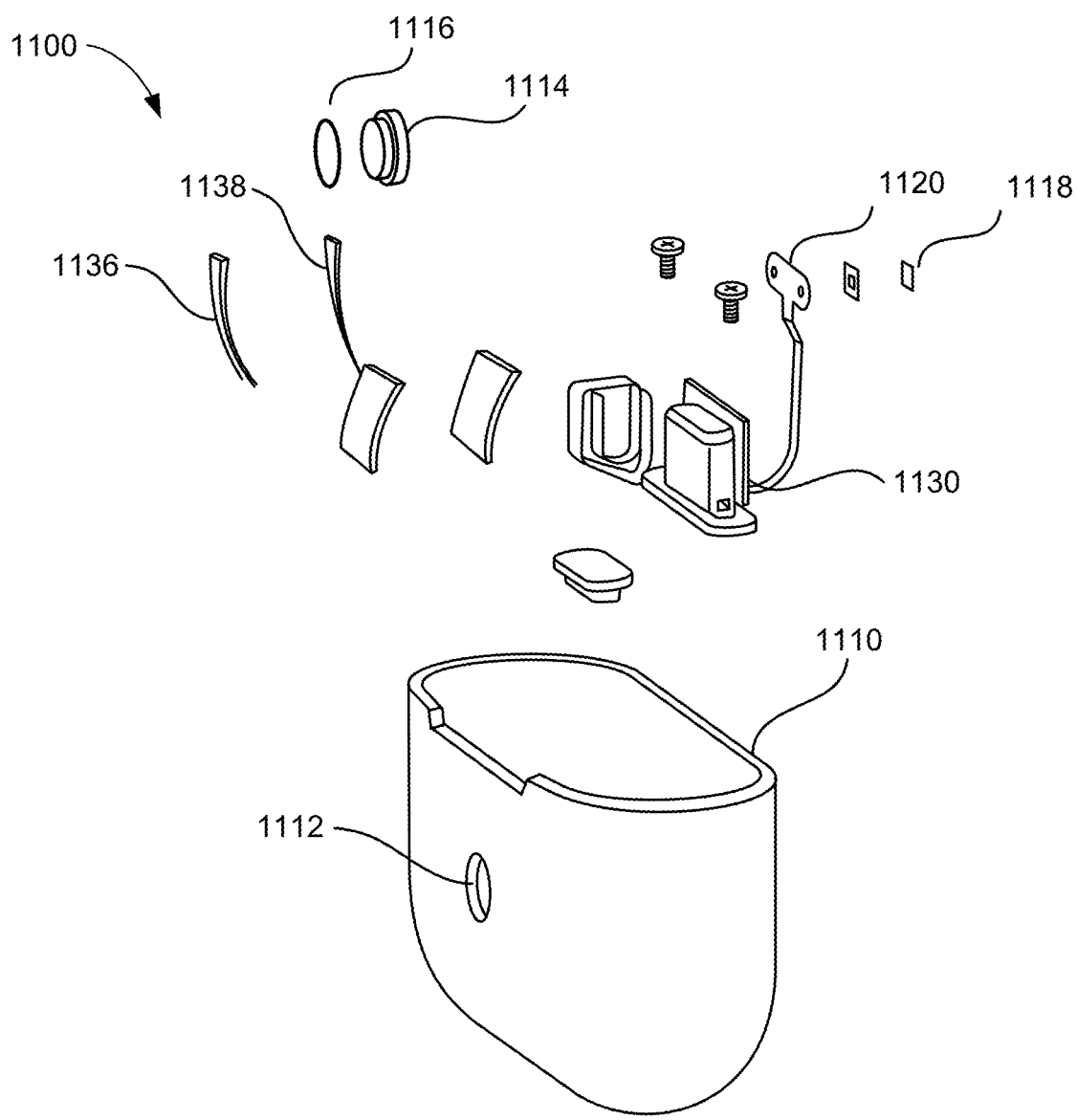
FIG. 11 is a simplified exploded view of various components that make up a bottom enclosure sub-assembly of the charging case depicted in FIGS. 6A-6C according to some embodiments.
Figure 12:
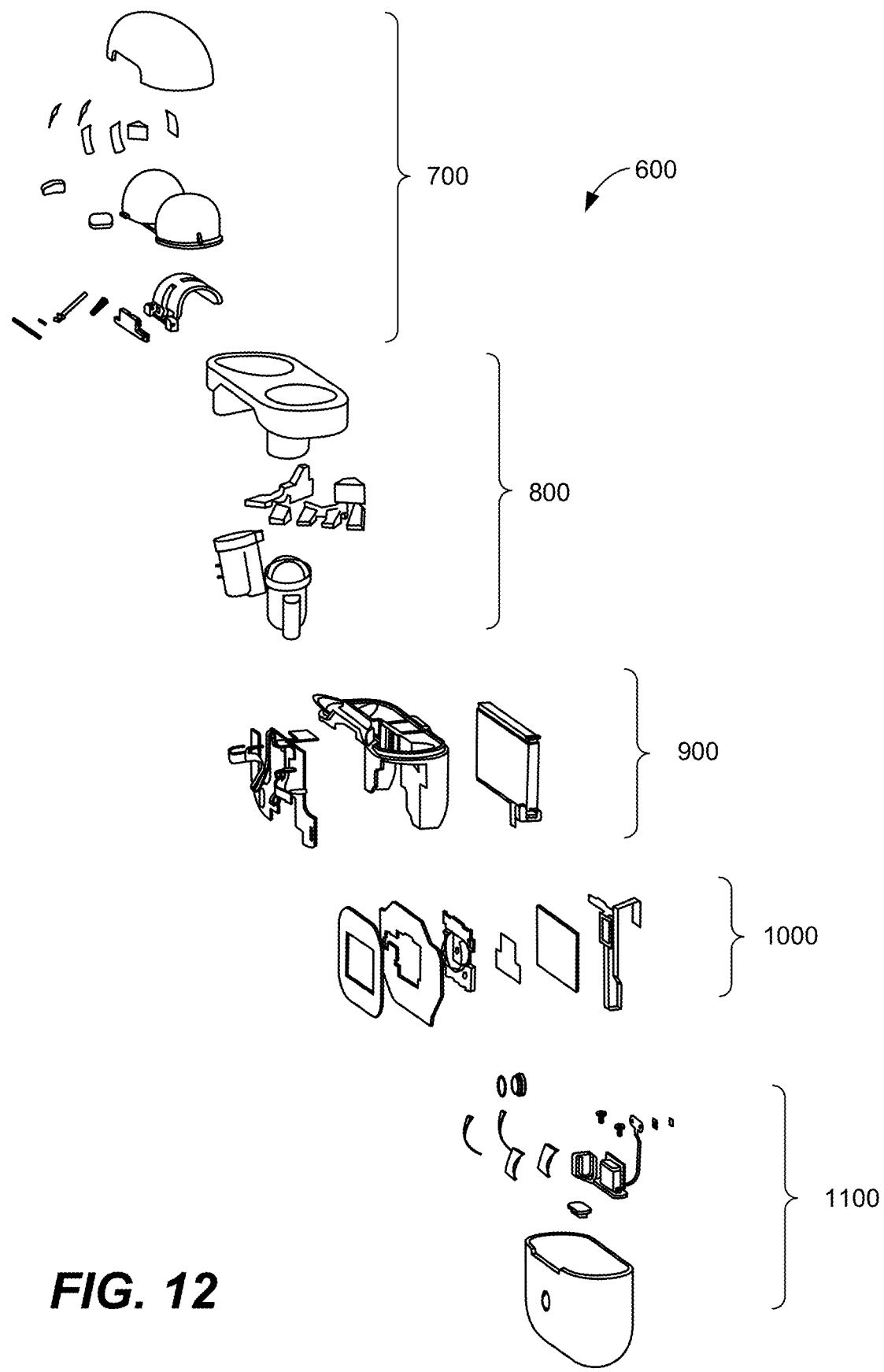
FIG. 12 is a simplified exploded view of the subassemblies 700, 800, 900, 1000 and 1100 arranged together according to some embodiments.

In some embodiments charging case 600 can include multiple different sub-assemblies that, when assembled together, make up the entirety of the charging case. FIGS. 7A-11 are simplified exploded views of various sub-assemblies that can be combined together, as illustrated in FIG. 12, according to some embodiments.

Lid Enclosure Sub-Assembly

Figure 7A:
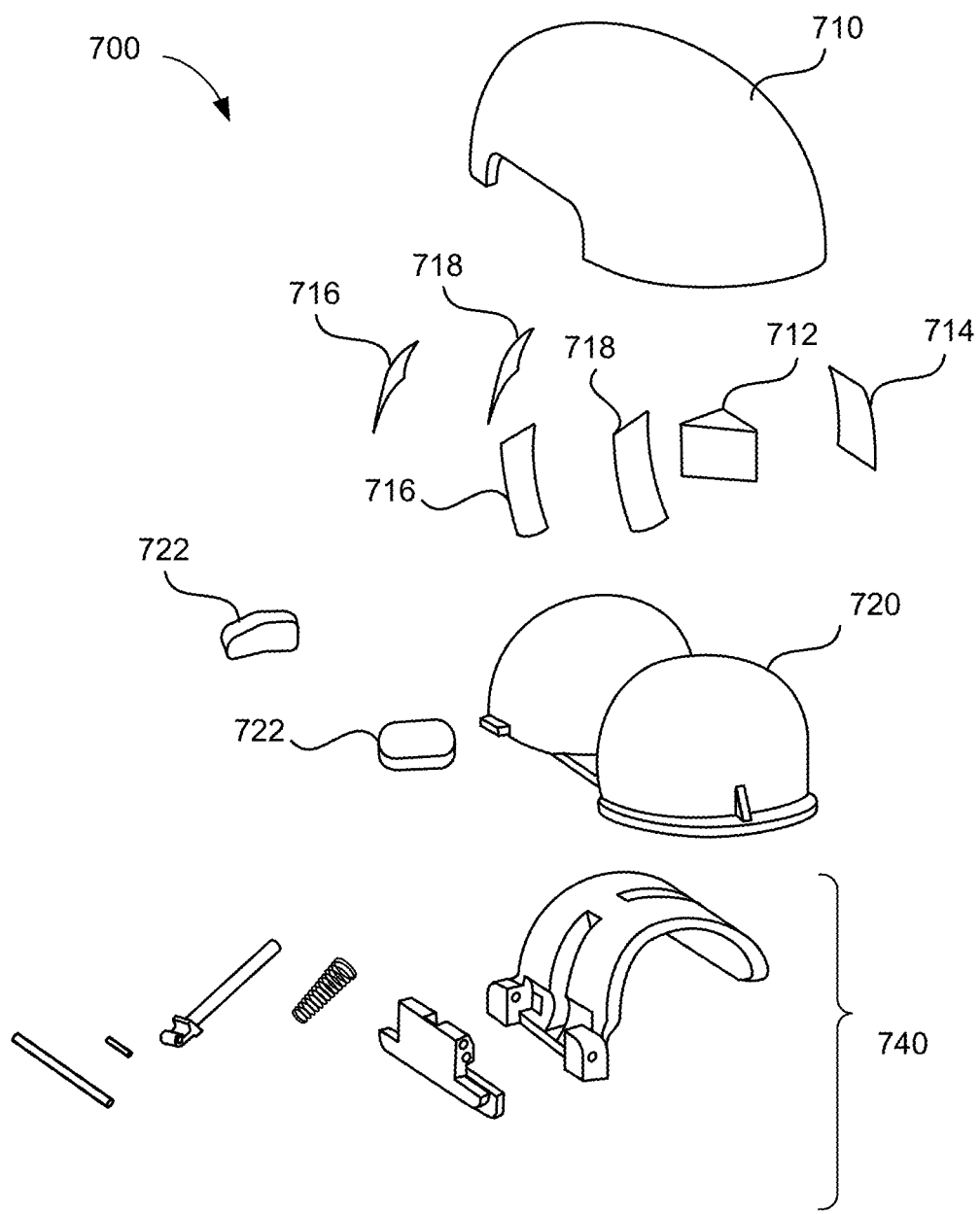
FIG. 7A is a simplified exploded view of various components that make up a lid enclosure sub-assembly that can be assembled together to form a lid of the charging case depicted in FIGS. 6A-6C according to some embodiments.

FIG. 7A is a simplified exploded view of various components that make up a lid enclosure sub-assembly 700 and that can be assembled together to form lid 602. As shown in FIG. 7A, some of the main components of sub-assembly 700 include a lid enclosure 710, a lid insert 720 and a hinge 740 that is discussed in more detail in FIG. 7B. Lid enclosure 710 defines an outer surface for the lid 602 of charging case 600. Lid insert 720 fits within and can be bonded to lid enclosure 710 to define an inner surface of lid 602. When stored in charging case 600, earbuds 300a, 300b can include a first portion (including the stems) that extends into an earbud receiving portion (e.g., a cavity) of the body 604 of the charging case and a second portion (including an upper portion of the speaker housing) that is positioned within an earbud receiving portion of the lid. A lower surface of lid insert 720 can be contoured to match a profile of the portion of the speaker housing of each earbud that extends into the lid 602.

A lid retention magnet 712 and lid retention shunt 714 can be secured to lid insert 720. Magnet 712 can be attracted to a magnetic component in body 604. For example, a shunt 822 (shown in FIG. 8) formed of a ferrous block of material, such as steel, can be positioned within body 604 immediately below a top surface of the charging case body and aligned with magnet 712 when lid 602 is in the closed position. Magnet 712 can be attracted to shunt 822 when the magnetic fields from magnet 712 interact with the ferrous properties of shunt 822. According to some embodiments, shunt 822 can operate as a hybrid retention and sensor shunt that can help lid 602 stay closed by attracting magnet 712, but also be used as a sensor component so that a sensor, such as a hall-effect sensor, positioned below shunt 822 can detect when lid 602 is opened or closed by the presence of a magnetic field through shunt 822.

Two magnets 716 can be disposed within the space between lid enclosure 710 and lid insert 720 and positioned along a back surface of the charging case. Magnets 716 can assist in the alignment of the charging case to a wireless charging device as discussed in more detail below. A pair of DC shields 718 can be disposed between the magnets 716 and the earbud receiving portion of lid 602 defined by the lid insert 720. The DC shields can serve to isolate electronic components within charging case 600 (including earbuds stored within the case) from magnetic fields generated by the 716. A pair of foam inserts 722 can also be included in upper lid sub-assembly 700 and disposed between lid enclosure 710 and lid insert 720.

Figure 7B:
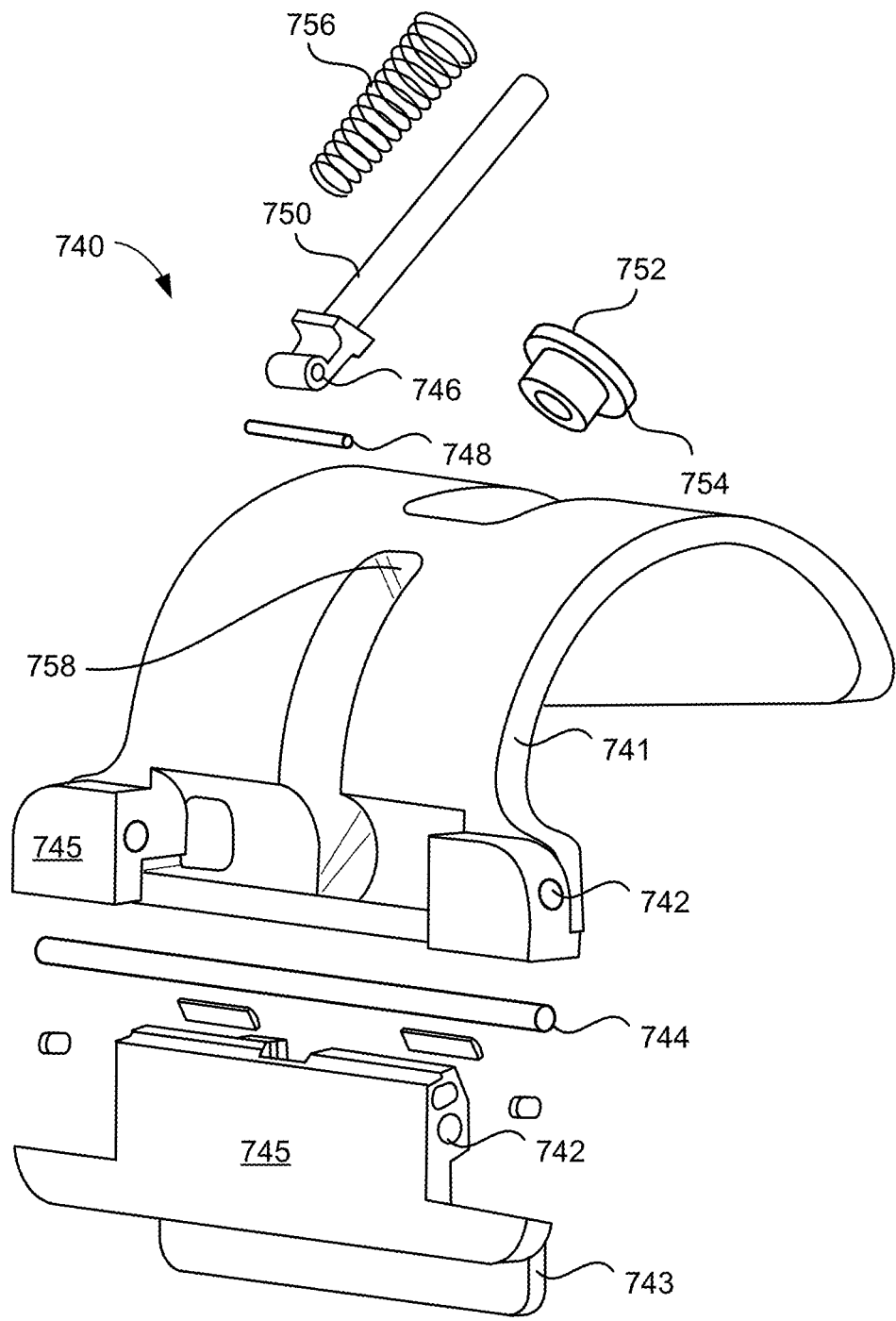
FIG. 7B illustrates a bistable hinge according to some embodiments that can be incorporated into a charging case, such as the charging case depicted in FIGS. 6A-6C.

In some embodiments, hinge 740 can be a bistable hinge that has two stable states: an open state and a closed state. Between the open and closed states, hinge 740 can have a neutral position where it does not pull to open or close the lid, but once the lid moves in one direction past the neutral position, the bistable hinge will either pull the lid open or pull the lid closed depending on which direction away from the neutral position the lid is moved. Thus, the lid can close without requiring a large number of magnets to generate a high magnetic attraction force to close the lid. FIG. 7B illustrates a bistable hinge 740 according to some embodiments. Specifically, FIG. 7B is a simplified perspective view of a hinge 740 that can be incorporated into lid 602 according to some embodiments.

Bistable hinge 740 can be formed as part of a lid 602 of a case. Bistable hinge 740 can include a first leaf 741 and a second leaf 743 that provide the frame for hinge 740. First leaf 741 can be fitted between lid enclosure 710 and lid insert 720 to connect hinge 740 to the lid. Second leaf 743 can be secured to body 604. Each of the two leafs 741, 743 includes a planar back surface 745 that forms part of the exterior surface of the charging case.

Hinge 740 includes first and second pivot points about which bistable hinge 740 can move to effectuate bistable opening and closing of lid 602. As an example, bistable hinge 740 can include a first pivot point 742 along a first shaft 744 that forms a first axis about which bistable hinge 740 rotates and a second pivot point 746 along a second shaft 748 that forms a second axis about which bistable hinge 740 rotates. The relative position between first shaft 744 and second shaft 748 can be fixed so that first shaft 744 and second shaft 748 are positioned a distance away from one another. An axis intersecting the first and second pivot points 742 and 746 can define the neutral position where bistable hinge 740 does not pull in either direction to open or close lid 602.

A first end of a piston rod 750 can be coupled to second shaft 748 so that piston rod 750 can pivot around second pivot point 746 as bistable hinge 740 transitions between open and closed positions, and a second end of piston rod 750 opposite from its first end can be attached to a stopper 752. Stopper 752 can include a flange region 754 that is annular in construction and is positioned around a portion of piston rod 750 and perpendicular to an outer surface of piston rod 750. A maximum open angle of lid 602 can be controlled with faces on first leaf 741 and second leaf 743 that hard stop on one another to prevent further motion of the hinge 740. In one particular implementation, hinge 740 can be designed to span fully open angles for lid 602 from 110 to 120 degrees, centered around 115 degrees.

To generate the spring-loaded forces for the operation of bistable hinge 740, a spring 756 can be implemented between a piston guide 758 and second pivot point 746. Spring 756 can be a coil spring that is wound about a portion of piston rod 750 so that it can apply force against piston guide 758. In certain instances, spring 756 is conical where it is wider in one end and narrower in the opposite end so that spring 756 can provide a force profile during transition between compressed and extended states. In some implementations, the conical spring can be designed to buckle when compressed to a certain extent where the buckling is controlled and yields a repeatable hinge torque profile. Spring 756 can generate force in a direction that is along an axis of piston rod 750 but directed away from piston guide 758. The direction of this force, when compared to the axis formed by the first and second pivot points 742 and 746 can effectuate the bistable operation of hinge 740.

Figure 7C:
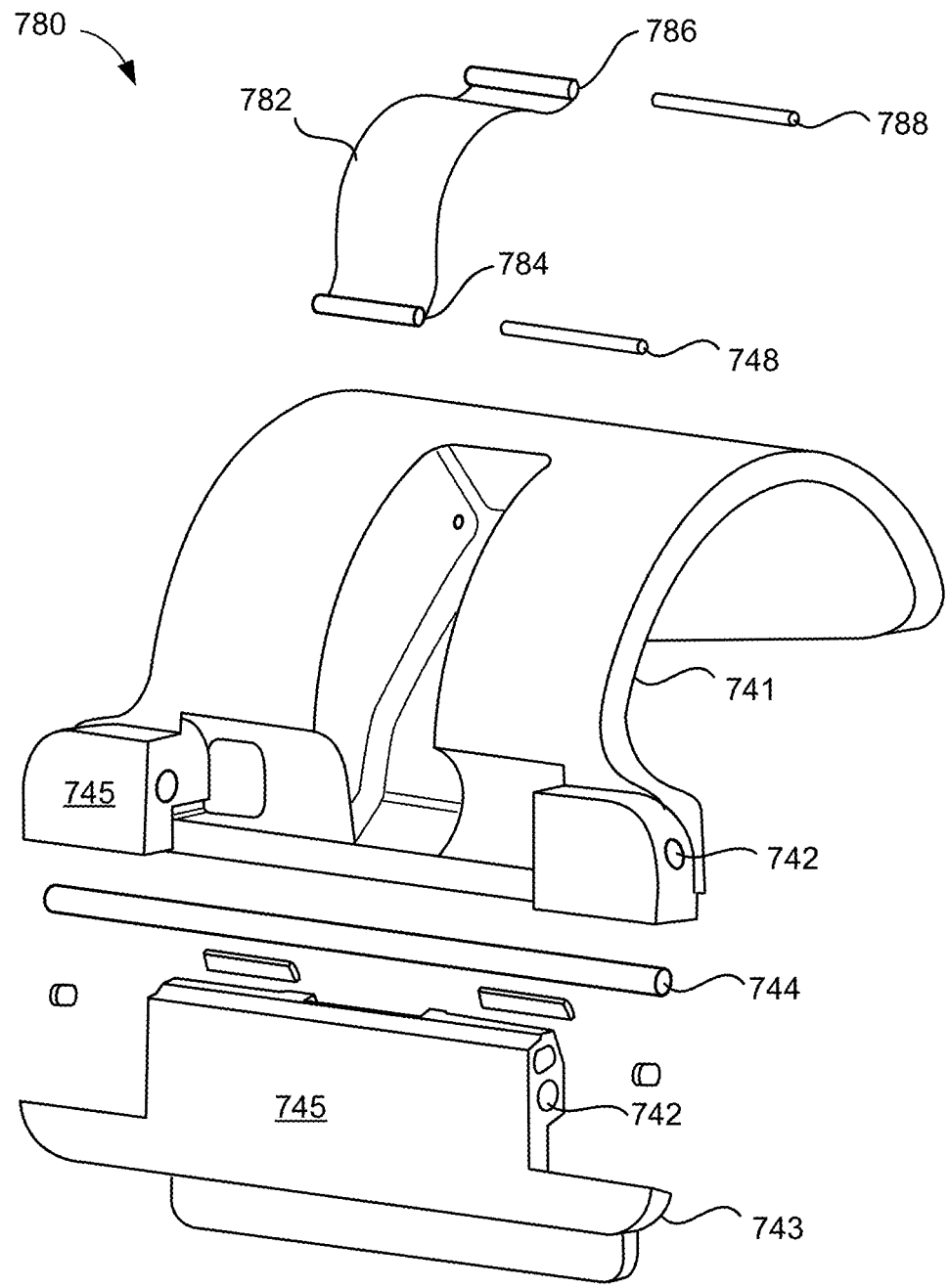
FIG. 7C is a simplified perspective view of a bi-stable hinge according to additional embodiments that can be incorporated into a charging case, such as the charging case depicted in FIGS. 6A-6C.

FIG. 7C is a simplified perspective view of a bistable leaf spring hinge 780 that can be incorporated into lid 602 instead of hinge 740 according to some embodiments. Hinge 780 includes a first pivot point 742 through which a shaft 744 extends as described above with respect to hinge 740. Hinge 780 does not include a link rod or the conical wire spring that envelopes the link rod. Instead, hinge 780 includes a leaf spring 782 that is connected to leaf 741 by first and second rods 748, 788. The design of leaf spring hinge 780 can provide a number of benefits including a lower part count, a lower cost due to the lower part count and fewer assembly steps, improved reliability and a smaller neutral angle range resulting in a better user experience.

Body Insert Sub-Assembly

Figure 8:
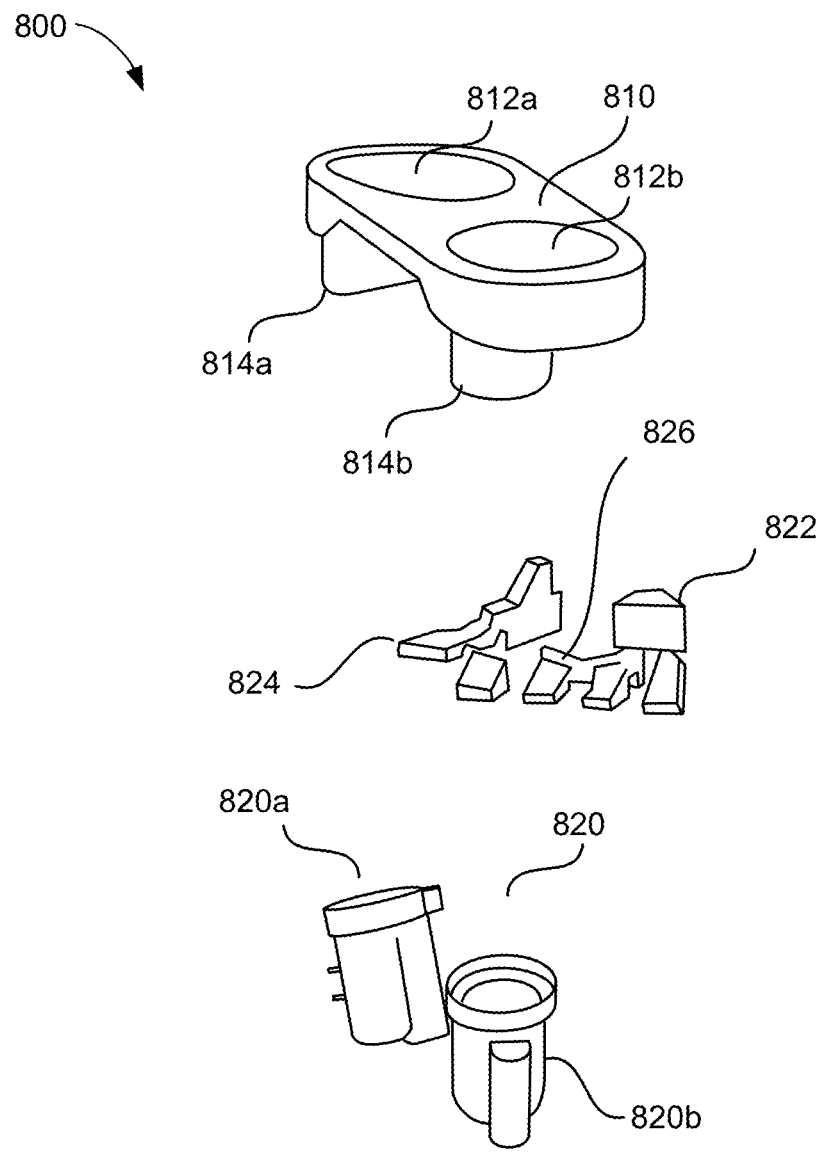
FIG. 8 is a simplified exploded view of various components that make up an insert sub-assembly that can be assembled together to form an interior portion of the charging case depicted in FIGS. 6A-6C.

FIG. 8 is a simplified exploded view of various components that make up an insert sub-assembly 800 and that can be assembled together to form an interior portion of body 604. As shown in FIG. 8, sub-assembly 800 includes an earbud carrier 810 and a contact carrier 820. Earbud carrier 810 can be formed of a monolithic structure designed to provide first and second bowl regions 812a, 812b spaced apart from each other that are each configured to accept a portion of the earbuds 300a, 300b, respectively. Each of the bowl regions 812a, 812b can include a receiving surface contoured to accept and match the exterior profile of a lower portion of the speaker housing of each earbud. Each of the cavities 812a, 812b opens, at a bottom portion of the cavity, to a respective tubular extension 814a, 814b.

Contact carrier 820 can include separate, first and second contact carriers 820a, 820b that can be coupled and bonded to extensions 814a and 814b, respectively, of earbud carrier 810. Each tubular extension is sized and shape to accept a portion of the stem of its respective earbud such that the tubular extension surrounds an upper portion of the stem. A lower portion of each stem, including the end of the stem upon which electrical contacts (not shown in FIG. 8) are positioned, protrudes through its respective tubular extension into its corresponding contact carrier. Each of the contact carriers 820a, 820b includes features that enable electrical contacts (not shown in FIG. 8) within charging case 600 to be secured to the contact carrier while a portion of the contacts extends into interior space of the contact carrier enabling the charging case contacts to be electrically coupled with the earbud contacts. In some embodiments, the contacts can be sealed from the outside environment to protect them from moisture. For instance, sealing rings can be strategically positioned at interface regions that are entry points to the charging case.

In some embodiments, earbud carrier 810 can be configured to seal the internal components of charging case 600 from the outside environment through the top of the case body 604. Thus, a sealing structure (not shown) formed of a pliable material suitable for sealing purposes can be disposed between the intersection of earbud carrier 810 and body 604. For instance, the sealing structure can extend around the perimeter of an upper portion of earbud carrier 810 and an inner surface of body 604.

Body Enclosure Insert Sub-Assembly 800 can also include lid retention shunt 822 discussed above, earbud retention magnets 824 and earbud retention shunt 826.

Skeleton Sub-Assembly

Figure 9:
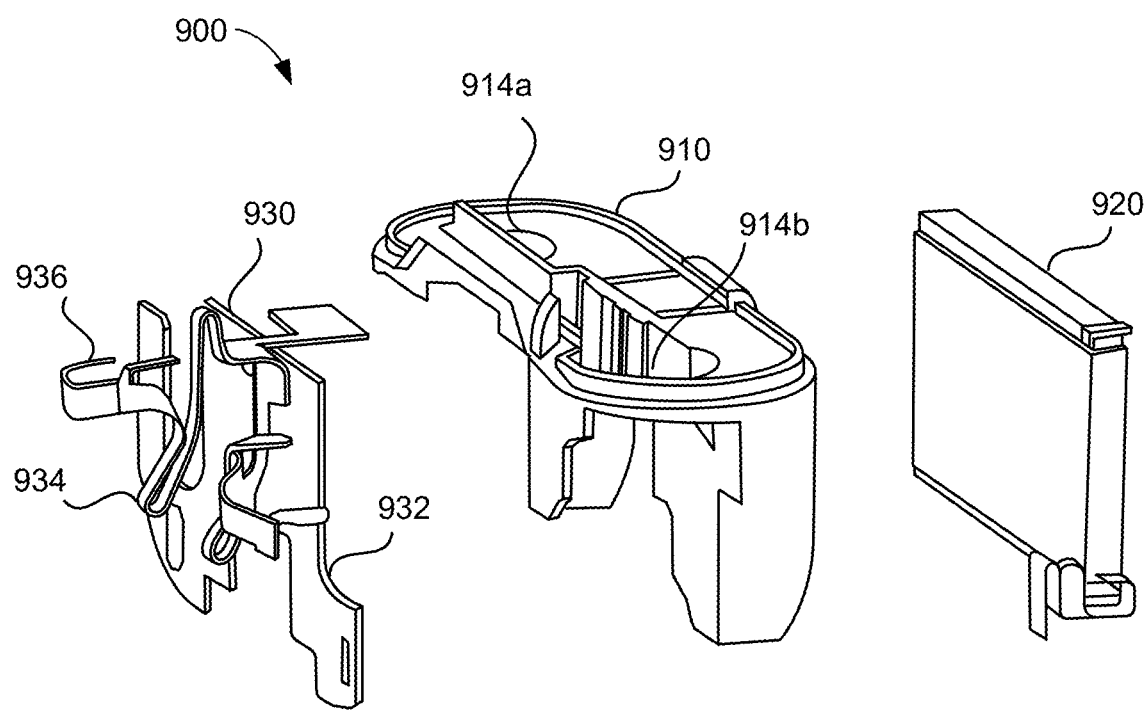
FIG. 9 is a simplified exploded view of various components that make up a skeleton sub-assembly that can form an interior portion of the charging case depicted in FIGS. 6A-6C.

FIG. 9 is a simplified exploded view of various components that make up a skeleton sub-assembly 900 and that can be attached to bottom insert sub-assembly 800 within body 604. Skeleton sub-assembly 900 includes an internal frame 910 that can be formed of a monolithic structure designed to provide contours and surface features against which various electronic components within charging case 600 can rest and/or attach. That is, internal frame 910 can provide a structural backbone for some of the internal components of charging case 600, and in the embodiment depicted in FIG. 9, internal frame 910 provides mounting locations for a battery module 920 and a circuit board module 930 as well as a coil sub-assembly 1100 discussed with respect to FIG. 11. Additionally, earbud carrier 810 can be mounted to an upper surface of internal frame 900 such that extensions 814a, 814b extend through openings 914a, 914b of the internal frame 910.

Battery module 920 includes a battery that provides power for the charging case and that can be used to recharge the batteries of one or both of earbuds 300a, 300b when the earbuds are stored in charging case 600. Circuit board module 930 can include a circuit board 932 upon which electronic components can be mounted. In some embodiments, circuit board 932 can be a rigid, multi-layer printed circuit board and electronic components and circuitry that provide the functionality, or a portion of the functionality, of one or more of case communication system 251, earbud interface 252, power receiving circuitry 253, computing system 255, and user interface 256 discussed with respect to FIG. 2. A flexible circuit board 934 can also be coupled circuit board 932 to provide an electrical connection to electrical contacts 936 of the charging case 600, which can be mounted to contact carriers 820a, 820b as discussed above.

Coil Sub-Assembly

Figure 10A:
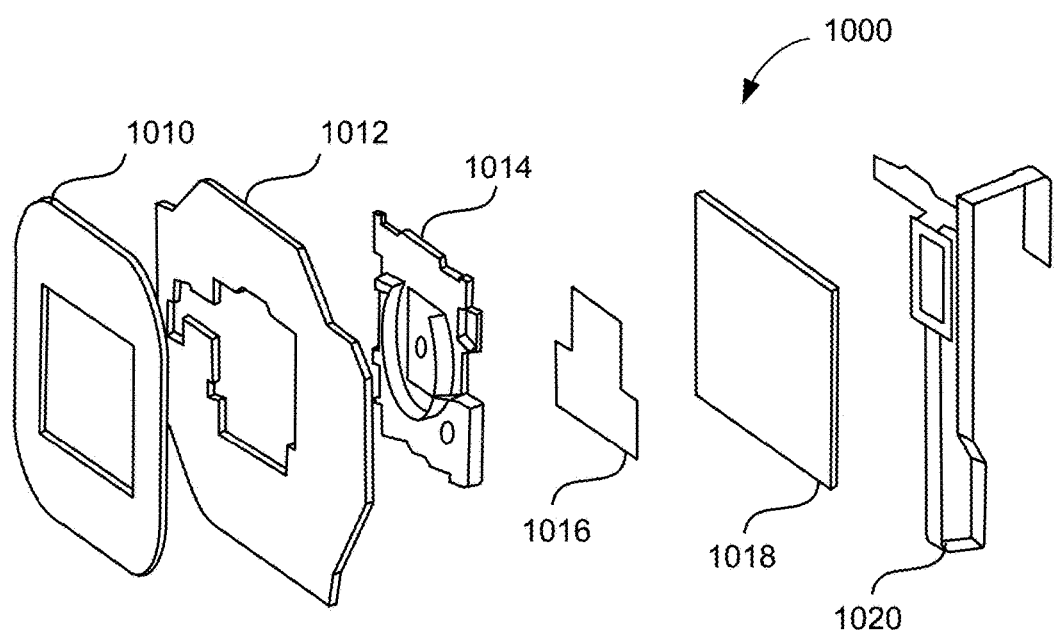
FIG. 10A is a simplified exploded view of various components that make up a coil sub-assembly that can be attached to the skeleton sub-assembly shown in FIG. 9 according to some embodiments.

FIG. 10A is a simplified exploded view of various components that make up a coil sub-assembly 1000 that can be laminated to an inner surface of the bottom enclosure. In one particular embodiment, coil sub-assembly 1000 can be positioned between battery module 920 and a rear inner surface of bottom enclosure 1110 (see FIG. 11). Coil sub-assembly 1000 can include a power receiving coil 1010, a coil shield 1012, a button housing 1014, an nanocrystalline shield 1016, a circuit board 1018 and a flex circuit 1020.

Figure 10B:
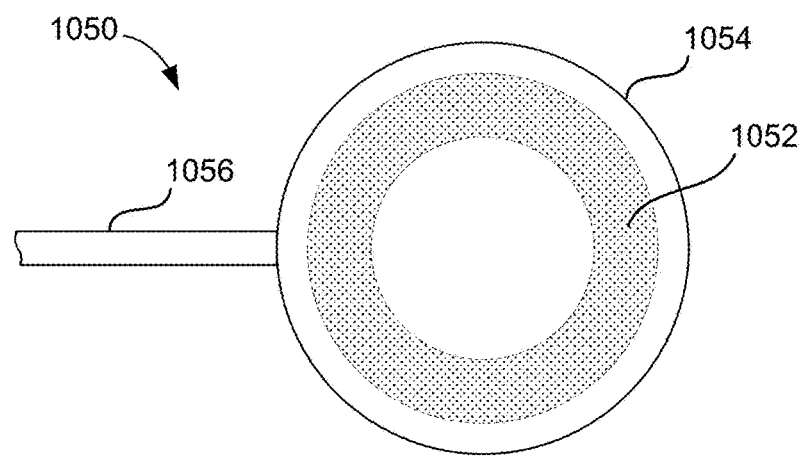
FIG. 10B is a simplified illustration of a wireless power charging device that can wirelessly provide power to the charging case depicted in FIGS. 6A-6C according to some embodiments.
Figure 10C:
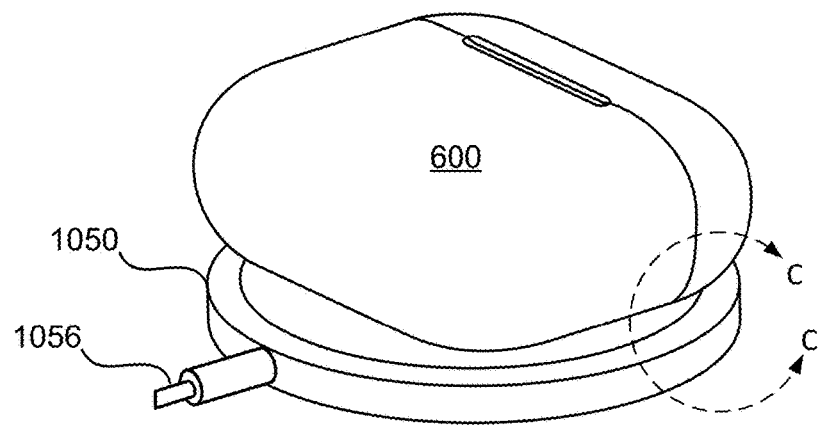
FIG. 10C is a simplified perspective view of a charging case according to some embodiments positioned on a wireless charger during a charging operation.

Coil sub-assembly 1000 enables charging case 600 to be inductively charged by an appropriate charging device. For example, FIG. 10B is a simplified illustration of a wireless power charging device 1050 that includes a power transmitting coil 1052 positioned within a housing 1054. Charging device 1050 also includes a cable 1056 that enables device 1050 to receive power from an external source. During wireless power transfer charging case 600 can be positioned on charging device 1050 as shown in FIG. 10C and transmitter coil 1052 can generate a time-varying magnetic flux, which can propagate through device housing 1054 and through the housing of charging case 600 where it can be received by receiving coil 1010. The time-varying magnetic flux interacts with receiver coil 1010 to generate a corresponding current in receiver coil 1010. The generated current can be used by charging case 600 (e.g., by electronic circuitry on circuit board 1018) to charge the battery within battery module 920.

Magnetic fields generated during a charging operation can potentially interfere with or harm circuitry within charging case 600. To prevent such fields from damaging or otherwise undesirably interfering with circuitry within charging case 600, coil shield 1012 can be positioned directly adjacent to power receiving coil 1010 such that coil shield 1012 shadows coil 1010 and is between the coil and circuit board 1018.

Button housing 1014 provides a structure for a user-input button 1114 (see FIG. 11) that, in some embodiments, allows a user to initiate a process to wireless pair earbuds 300a, 300b with a host device using a wireless communication protocol, such as Bluetooth. In some embodiments, a memory unit in the earbuds or the charging case stores information on previous pairings that enables the earbuds to be automatically paired with an authorized host device when the earbuds and authorized host device are within range of each other. In such embodiments, input button 1114 can be used to initiate pairing of earbuds with a new device with each a pairing was not previously made.

Figure 10D:
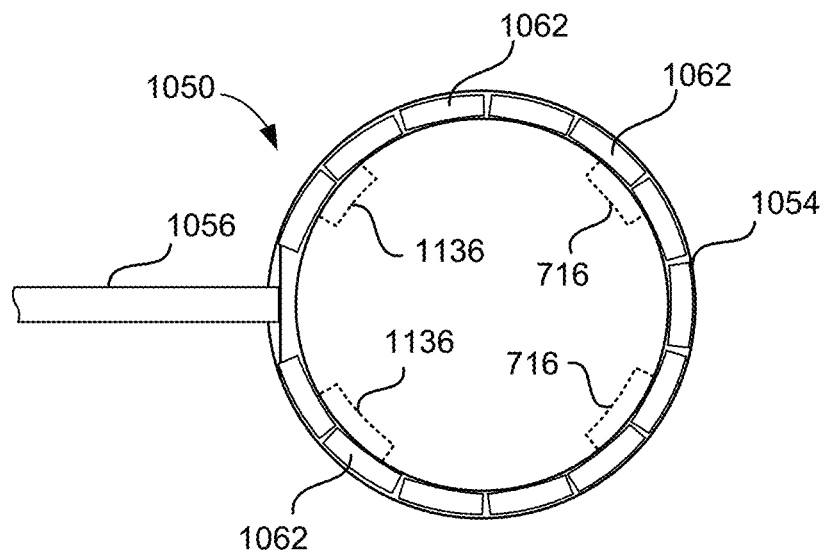
FIG. 10D is a simplified top view illustration of a wireless charger showing the position of magnets disposed within a charging case according to some embodiments with respect to a magnetic array of the wireless charger.

To improve charging efficiency, charging case 600 can include a permanent magnet array that aligns receiving coil 1010 with a transmitting coil of a compatible wireless charger, such as transmitting coil 1052. In some embodiments, the magnet array can includes four separate magnets positioned near the corners of the back surface of charging case 600. For example, in some embodiments the magnet array can include a first pair of magnets 716 disposed within lid enclosure 710 (see FIG. 7A) along the rear surface 620 (FIG. 6C) of charging case 600 and a second pair of magnets 1136 disposed within bottom enclosure 1110 (see FIG. 11) along the rear surface 620. DC shields 718 (FIG. 7A) and 1138 (FIG. 11) can be positioned adjacent to each magnet to isolate electronic components within charging case 600 from magnetic fields generated by the magnets 716, 1136. Due to the compact size of charging case 600, in order provide appropriate spacing between the magnets so that the magnets can align with corresponding magnetic structures in the wireless charger (e.g., an array of magnets 1062 as shown in FIG. 10D), in some embodiments the magnets 716 are positioned in the lid 602 of the charging case while magnets 1136 are positioned in the body 604 of the charging case.

Figure 10E:
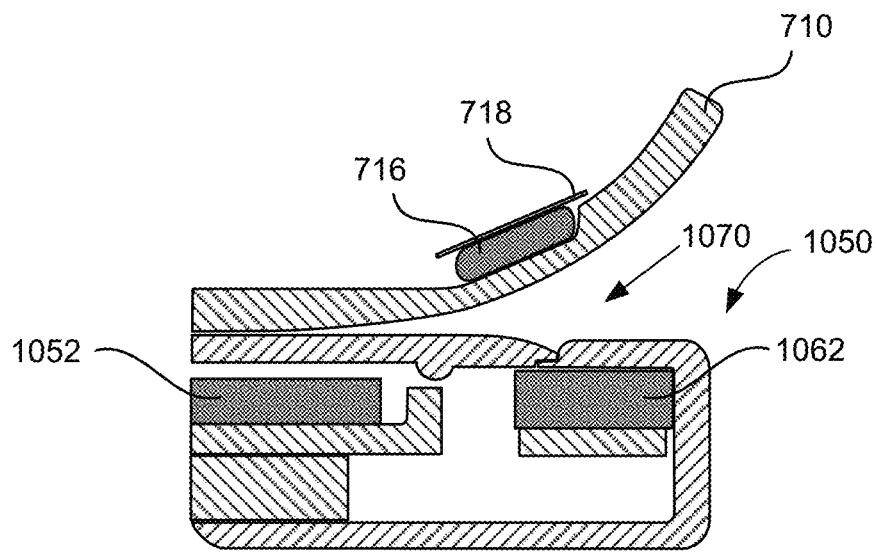
FIG. 10E is a simplified cross-sectional view in the region C-C shown in FIG. 10C.

In some embodiments, magnets 716, 1136 are positioned at the outer edges of the charging case 600 such that the magnets are positioned along the curvature of lid 602 and body 604 as shown, for example, in FIG. 10E. Also, as shown in FIG. 10D, in some embodiments magnets 716, 1136 are positioned along a radius that is slightly less than the radius of magnet array 1062. When the charging case 600 is positioned on wireless charging device 1050, the magnets 716, 1136 align to magnetic array 1062 creating a magnetic field that has a pull direction downwards and towards the inner ring of magnetic array 1062 centering charging case 600 on wireless charging device 1050. The placement of the magnets 716, 1136 along the curvature of the housing of charging case 600 creates a gap or space 1070 between the charging case magnets 716,1136 and the charging device magnets 1062, which can help prevent magnetic particles from getting stuck in the attraction zone between the magnets. Bottom Enclosure Sub-Assembly FIG. 11 is a simplified exploded view of various components that make up a bottom enclosure sub-assembly 1100 according to some embodiments. Sub-assembly 1100 includes a bottom enclosure 1110 that defines an outer surface of the body 604 of charging case 600. Bottom enclosure is complementary to lid enclosure 710 and the two components can be coupled together in a clam shell arrangement by a hinge, such as hinge 740 or hinge 780. Bottom enclosure 1110 can include one or more cutouts for various features of charging case 600. As depicted in FIG. 11, a cutout 1112 is formed at a central location on the rear surface of enclosure 1110 and a button 1114 extends through cutout 1112 such that an outer surface of button 1114 is flush with an exterior surface of bottom enclosure 1110. An o-ring 1116 can form a seal between button 1114 and enclosure 1110 to reduce or prevent the ingress of moisture through cutout 1112. Button 612 shown in FIG. 6C can be representative of button 1114.

Enclosure 1110 can also include a smaller cutout (not shown in FIG. 11) on its surface opposite cutout 1112 that for a light guide 1118 that directs light from an emitter 1120, such as an LED of VSCEL, to the exterior surface of charging case 600, and a third cutout (also not shown in FIG. 11) on a bottom surface of enclosure 1110. The third cutout provides an opening for a receptacle connector 1130 that enables a physical connector to be plugged into charging case 600. As described with respect to FIG. 6, in some embodiments the physical connector can be a Lightning Connector by Apple, Inc. but embodiments are not limited to any particular connector type and in other embodiments connector 1130 can be any other appropriate small form factor connector including a USB-C connector, a mini- or micro-USB connector or the like.

Also shown in FIG. 11 are magnets 1136 and DC shields 1138 discussed above. FIG. 12 is a simplified exploded view of the subassemblies 700, 800, 900, 1000 and 1100 arranged together according to some embodiments. As shown in FIG. 12, subassemblies 800, 900, 1000 and 100 form the body portion 604 of charging case 600. Subassembly 700 generally forms the lid 602 of the charging case except for the leaf 743 portion of hinge 740 that is mounted to body 604 enabling the hinge to connect the lid 602 to body 604.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. Also, while different embodiments of the invention were disclosed above, the specific details of particular embodiments may be combined in any suitable manner without departing from the spirit and scope of embodiments of the invention. Further, it will be apparent to one of ordinary skill in the art that many modifications and variations are possible in view of the above teachings.

Finally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An earphone comprising:
   a device housing having an exterior wall that defines an internal cavity within the device housing;
   an acoustic port formed through the exterior wall of the device housing and having an opening at an exterior surface of the device housing, the acoustic port having a sidewall that extends between inner and outer surfaces of the exterior wall, the sidewall including first and second concentric faces separated by a shelf;
   an audio driver disposed within the device housing and aligned to emit sound through the acoustic port; and
   a mesh coupled to the shelf within the acoustic port and having an outer periphery spaced apart from the first sidewall face forming a gap between the periphery of the mesh and the first sidewall face, wherein the mesh forms a portion of an exterior surface of the earphone that is recessed from the opening at the exterior surface of the device housing.

2. The earphone set forth in claim 1 wherein the mesh is recessed within the acoustic port between 0.5 to 2.0 mm from an opening at the exterior surface of the device housing.

3. The earphone set forth in claim 2 wherein the mesh has a convex profile in which outer edges of the mesh are recessed further from the opening at the exterior surface of the housing than a center of the mesh.

4. The earphone set forth in claim 1 wherein the wall includes first and second edges separated by a shelf that extends fully around a perimeter of the acoustic port.

5. The earphone set forth in claim 4 wherein the shelf defines an acoustic dead zone that surrounds an outer periphery of acoustic port and the outer periphery of the mesh is disposed within the acoustic dead zone.

6. The earphone set forth in claim 1 wherein the mesh comprises a multi-layer mesh including an outer cosmetic mesh and an inner acoustic mesh.

7. The earphone set forth in claim 1 wherein the device housing comprises a speaker housing and a stem extending away from the speaker housing, wherein the speaker housing and stem combine to define the internal cavity within the device housing.

8. The earphone set forth in claim 7 wherein a user input region is provided along a portion of the stem.

9. The earphone set forth in claim 8 further comprising a force sensor disposed within the stem adjacent to the user input region.

10. The earphone set forth in claim 9 further comprising an antenna disposed within the stem.

11. The earphone set forth in claim 1 further comprising:
a bass port formed through the housing and configured to provide an acoustic pathway from the driver that allows air to flow easier within the acoustic pathway for low frequency sounds; and
a control leak formed through the housing and configured to provide an atmospheric pass-through between an outside environment and the acoustic port such that, when the earphone is worn by a user, the housing does not completely seal a user's ear canal and trap pressure within the ear canal.

12. A portable acoustic device comprising:
a device housing that defines an internal cavity within the device housing, the device housing comprising a speaker housing portion and a stem portion extending away from the speaker housing portion, wherein the speaker housing portion and stem portion combine to define the internal cavity within the device housing;
an acoustic port formed through an exterior wall of the device housing and having an opening at an exterior surface of the device housing, wherein the acoustic port is defined by a sidewall that extends between inner and outer surfaces of the exterior wall and includes first and second edges separated by a shelf that extends fully around a perimeter of the acoustic port;
an audio driver disposed within the device housing and aligned to emit sound through the acoustic port; and
a mesh coupled to the shelf within the acoustic port and having an outer periphery spaced apart from the first edge of the shelf forming a gap between the periphery of the mesh and the first edge of the shelf, wherein the mesh forms a portion of an exterior surface of the portable acoustic device that is recessed from the opening at the exterior surface of the speaker housing.

13. The portable acoustic device set forth in claim 12 wherein the shelf defines an acoustic dead zone that surrounds an outer periphery of acoustic port and the outer periphery of the mesh is disposed within the acoustic dead zone.

14. The portable acoustic device set forth in claim 12 wherein the mesh is recessed within the acoustic port between 0.5 to 2.0 mm from an opening at the exterior surface of the speaker housing.

15. The portable acoustic device set forth in claim 14 wherein the mesh has a convex profile in which outer edges of the mesh are recessed further from the opening at the exterior surface of the housing than a center of the mesh.

16. The portable acoustic device set forth in claim 12 wherein the mesh comprises a multi-layer mesh including an outer cosmetic mesh and an inner acoustic mesh.

17. A portable wireless acoustic device comprising:
a device housing that defines an internal cavity within the device housing, the device housing comprising a speaker housing portion and a stem portion extending away from the speaker housing portion, wherein the speaker housing portion and stem portion have external walls that combine to define the internal cavity within the device housing;
a wireless antenna disposed within the housing;
an acoustic port formed through the exterior wall of the speaker housing and having an opening at an exterior surface of the device housing, wherein the acoustic port is defined by a sidewall that extends between inner and outer surfaces of the exterior wall and includes first and second faces separated by a shelf that extends fully around a perimeter of the acoustic port;
an audio driver disposed within the device housing and aligned to emit sound through the acoustic port;
a battery disposed within the housing; and
a mesh coupled to the shelf within the acoustic port and having an outer periphery spaced apart from the device housing wall first face forming a gap between a periphery of the mesh and the first sidewall face, wherein the mesh forms a portion of an exterior surface of the portable wireless acoustic device that is recessed from the opening at the exterior surface of the device housing.

18. The portable wireless acoustic device set forth in claim 17 wherein the mesh is recessed within the acoustic port between 0.5 to 2.0 mm from an opening at the exterior surface of the speaker housing.

19. The portable wireless acoustic device set forth in claim 18 wherein the housing comprises a hard radio frequency (RF) transparent plastic.

20. The portable wireless acoustic device set forth in claim 19 further comprising a user input region is provided along a portion of the stem and a force sensor disposed within the stem adjacent to the user input region.

* * * * *